(12) United States Patent
Leverett

(10) Patent No.: US 8,321,380 B1
(45) Date of Patent: Nov. 27, 2012

(54) UNORDERED IDEMPOTENT REPLICATION OPERATIONS

(75) Inventor: Bruce Leverett, Pittsburgh, PA (US)

(73) Assignee: NetApp, Inc., Sunnyvale, CA (US)

( * ) Notice: Subject to any disclaimer, the term of this patent is extended or adjusted under 35 U.S.C. 154(b) by 286 days.

(21) Appl. No.: 12/433,871

(22) Filed: Apr. 30, 2009

(51) Int. Cl.
G06F 17/30 (2006.01)

(52) U.S. Cl. ....................................................... 707/660

(58) Field of Classification Search .................. 707/658, 707/660
See application file for complete search history.

(56) References Cited

U.S. PATENT DOCUMENTS

| | | | |
|---|---|---|---|
| 5,504,861 A | 4/1996 | Crockett et al. |
| 5,592,618 A | 1/1997 | Micka et al. |
| 5,657,440 A | 8/1997 | Micka et al. |
| 5,682,513 A | 10/1997 | Candelaria et al. |
| 5,812,773 A | 9/1998 | Norin |
| 5,819,292 A | 10/1998 | Hitz et al. |
| 6,144,999 A | 11/2000 | Khalidi et al. |
| 6,502,205 B1 | 12/2002 | Yanai et al. |
| 6,539,396 B1 | 3/2003 | Bowman-Amuah |
| 6,711,693 B1 | 3/2004 | Golden et al. |
| 6,725,342 B1 | 4/2004 | Coulson |
| 6,842,825 B2 | 1/2005 | Geiner et al. |
| 6,993,539 B2 | 1/2006 | Federwisch et al. |
| 7,028,147 B2 | 4/2006 | Wu et al. |
| 7,136,882 B2 | 11/2006 | Collins et al. |
| 7,152,077 B2 | 12/2006 | Veitch et al. |
| 7,152,120 B2 | 12/2006 | Yamagami |
| 7,203,732 B2 | 4/2007 | McCabe et al. |
| 7,237,076 B2 | 6/2007 | Nakano et al. |
| 7,243,115 B2 | 7/2007 | Manley et al. |
| 7,293,137 B2 | 11/2007 | Factor et al. |
| 7,302,634 B2 | 11/2007 | Lucovsky |
| 7,325,109 B1 | 1/2008 | Muppalaneni et al. |
| 7,376,796 B2 | 5/2008 | Corbett et al. |
| 7,467,265 B1 | 12/2008 | Tawri et al. |
| 7,539,976 B1 | 5/2009 | Ousterhout et al. |
| 7,562,077 B2 | 7/2009 | Bisson et al. |
| 7,571,268 B2 | 8/2009 | Kern et al. |
| 7,606,841 B1 | 10/2009 | Ranade |
| 7,624,109 B2 | 11/2009 | Testardi |
| 7,634,594 B1 | 12/2009 | Bezbaruah et al. |
| 7,653,668 B1 | 1/2010 | Shelat et al. |
| 7,814,074 B2 | 10/2010 | Anglin et al. |
| 7,818,495 B2 | 10/2010 | Tanaka et al. |

(Continued)

FOREIGN PATENT DOCUMENTS

EP 1617330 A2 1/2006

OTHER PUBLICATIONS

Co-pending U.S. Appl. No. 12/187,305, filed Aug. 6, 2008.

(Continued)

*Primary Examiner* — William Spieler
(74) *Attorney, Agent, or Firm* — Perkins Coie LLP

(57) ABSTRACT

At least certain embodiments disclose a method and apparatus for replicating a file system at the logical block level in an unordered stream of individual data units. In at least certain embodiments, the replication operations include creating a snapshot of a file system of a source storage system, identifying changes in the file system since a previous replication operation by comparing the snapshot with a previous snapshot created during the earlier replication operation, and asynchronously transferring the identified changes to a destination storage system in an unordered stream of individual data units.

21 Claims, 12 Drawing Sheets

U.S. PATENT DOCUMENTS

| | | | |
|---|---|---|---|
| 7,885,923 | B1 | 2/2011 | Tawri et al. |
| 7,900,003 | B2 | 3/2011 | Ben-Yehuda et al. |
| 7,925,629 | B2 | 4/2011 | Webman et al. |
| 7,937,371 | B2 | 5/2011 | Bates et al. |
| 7,984,022 | B2 | 7/2011 | Cannon et al. |
| 7,996,371 | B1 | 8/2011 | Deshmukh |
| 8,099,571 | B1* | 1/2012 | Driscoll et al. ............... 711/162 |
| 8,150,800 | B2 | 4/2012 | Webman et al. |
| 2002/0039370 | A1 | 4/2002 | Elliot |
| 2003/0018878 | A1 | 1/2003 | Dorward et al. |
| 2003/0065873 | A1 | 4/2003 | Collins et al. |
| 2003/0101223 | A1 | 5/2003 | Pace et al. |
| 2003/0177154 | A1 | 9/2003 | Vrancic |
| 2003/0182313 | A1 | 9/2003 | Federwisch et al. |
| 2003/0182325 | A1* | 9/2003 | Manley et al. ................ 707/204 |
| 2003/0204692 | A1 | 10/2003 | Tamer et al. |
| 2004/0030703 | A1 | 2/2004 | Bourbonnais et al. |
| 2004/0030837 | A1 | 2/2004 | Geiner et al. |
| 2004/0039774 | A1 | 2/2004 | Xu et al. |
| 2004/0139367 | A1 | 7/2004 | Boyd et al. |
| 2004/0186968 | A1 | 9/2004 | Factor et al. |
| 2004/0205372 | A1 | 10/2004 | Moser et al. |
| 2004/0250029 | A1 | 12/2004 | Ji et al. |
| 2004/0260736 | A1 | 12/2004 | Kern et al. |
| 2005/0015413 | A1 | 1/2005 | Teodosiu et al. |
| 2005/0050115 | A1 | 3/2005 | Kekre |
| 2005/0055357 | A1 | 3/2005 | Campbell |
| 2005/0071708 | A1 | 3/2005 | Bartfai et al. |
| 2005/0097260 | A1 | 5/2005 | McGovern et al. |
| 2005/0144202 | A1 | 6/2005 | Chen |
| 2005/0154786 | A1 | 7/2005 | Shackelford |
| 2005/0278382 | A1 | 12/2005 | LaRocca et al. |
| 2006/0006918 | A1 | 1/2006 | Saint-Laurent |
| 2006/0015507 | A1 | 1/2006 | Butterworth et al. |
| 2006/0059322 | A1 | 3/2006 | Poston |
| 2006/0095480 | A1 | 5/2006 | Vaughn et al. |
| 2006/0106895 | A1 | 5/2006 | Vaughn et al. |
| 2006/0168402 | A1 | 7/2006 | Ahmad et al. |
| 2006/0173985 | A1 | 8/2006 | Moore |
| 2006/0200761 | A1 | 9/2006 | Judd et al. |
| 2006/0271727 | A1 | 11/2006 | Wang et al. |
| 2007/0011281 | A1 | 1/2007 | Jhoney et al. |
| 2007/0022264 | A1 | 1/2007 | Bromling et al. |
| 2007/0094466 | A1 | 4/2007 | Sharma et al. |
| 2007/0118687 | A1 | 5/2007 | McGovern et al. |
| 2007/0165549 | A1 | 7/2007 | Surek et al. |
| 2007/0168633 | A1 | 7/2007 | English et al. |
| 2007/0174687 | A1 | 7/2007 | Graham et al. |
| 2007/0185937 | A1 | 8/2007 | Prahlad et al. |
| 2007/0185938 | A1 | 8/2007 | Prahlad et al. |
| 2007/0208790 | A1 | 9/2007 | Reuter et al. |
| 2007/0208839 | A1 | 9/2007 | Voigt et al. |
| 2007/0214194 | A1 | 9/2007 | Reuter |
| 2007/0239950 | A1 | 10/2007 | Kern et al. |
| 2007/0256055 | A1 | 11/2007 | Herscu |
| 2007/0288708 | A1 | 12/2007 | Saha et al. |
| 2008/0077762 | A1 | 3/2008 | Scott et al. |
| 2008/0162594 | A1 | 7/2008 | Poston |
| 2008/0243950 | A1 | 10/2008 | Webman et al. |
| 2008/0243951 | A1 | 10/2008 | Webman et al. |
| 2008/0243952 | A1 | 10/2008 | Webman et al. |
| 2008/0288646 | A1 | 11/2008 | Hasha et al. |
| 2010/0049753 | A1 | 2/2010 | Prahlad et al. |
| 2010/0169275 | A1 | 7/2010 | Chen et al. |
| 2010/0250497 | A1 | 9/2010 | Redlich et al. |
| 2011/0040728 | A1 | 2/2011 | Akirav et al. |

OTHER PUBLICATIONS

Co-pending U.S. Appl. No. 12/713,744, filed Feb. 26, 2010.
Co-pending U.S. Appl. No. 12/559,483, filed Sep. 14, 2009.
Co-pending U.S. Appl. No. 11/692,663, filed Mar. 28, 2007.
Co-pending U.S. Appl. No. 11/692,668, filed Mar. 28, 2007.
Co-pending U.S. Appl. No. 11/692,659, filed Mar. 28, 2007.
Chutani, et al. "The Episode File System", Proc. 1992 Winter USENIX Conference, pp. 43-60 (1992).
Howard, et al., "Scale and Performance in a Distributed File System", ACM Transactions on Computer Systems, vol. 6, No. 1, Feb. 1988, pp. 51-81.
Mills, D.L., "Network Time Protocol (Version 3) Specification, Implementation and Analysis," Network Working Group, XP002935527, Mar. 1, 1992, pp. 1-v11 and 1-133.
Bob Sidebotham, "Volumes: The Andrew File System Data Structuring Primitive", EUUG Conference Proceedings Manchester, United Kingdom, pp. 1-8, Autumn 1986.
International Search Report PCT/US2008/003554 Dated Aug. 26, 2008, pp. 1-3.
Written Opinion PCT/US2008/003554 Dated Aug. 26, 2008, pp. 1-6.
International Search Report PCT/US2008/003612 Dated Nov. 5, 2008, pp. 1-3.
Written Opinion PCT/US2008/003612 Dated Nov. 5, 2008, pp. 1-8.
International Search Report PCT/US2008/003692 Dated Nov. 5, 2008, pp. 1-3.
Written Opinion PCT/US2008/003692 Dated Nov. 5, 2008, pp. 1-8.
Non-Final Office Action Mailed Mar. 1, 2010 in Co-Pending U.S. Appl. No. 11/692,666, filed Mar. 28, 2007.
Final Office Action Mailed Aug. 27, 2009 in Co-Pending U.S. Appl. No. 11/692,666, filed Mar. 28, 2007.
Non-Final Office Action Mailed Apr. 1, 2009 in Co-Pending U.S. Appl. No. 11/692,666, filed Mar. 28, 2007.
Co-pending U.S. Appl. No. 11/692,683, filed Mar. 28, 2007.
Co-pending U.S. Appl. No. 12/610,231, filed Oct. 30, 2009.
Co-pending U.S. Appl. No. 12/610,234, filed Oct. 30, 2009.
Final Office Action Mailed Aug. 27, 2009 in Co-Pending U.S. Appl. No. 11/692,668, filed Mar. 28, 2007.
Non-Final Office Action Mailed Apr. 1, 2009 in Co-Pending U.S. Appl. No. 11/692,668, filed Mar. 28, 2007.
Non-Final Office Action Mailed Jul. 21, 2010 in Co-Pending U.S. Appl. No. 11/692,683, filed Mar. 28, 2007.
Non-Final Office Action Mailed Mar. 1, 2010 in Co-Pending U.S. Appl. No. 11/692,668, filed Mar. 28, 2007.
Non-Final Office Action Mailed Sep. 10, 2010 in Co-Pending U.S. Appl. No. 11/692,668, filed Mar. 28, 2007.
Notice of Allowance Mailed Jul. 22, 2010 in Co-Pending U.S. Appl. No. 11/692,668, filed Mar. 28, 2007.
Freeman, et al., "Configuring NetApp Deduplication with LUN's," http:/communities.netapp.com/docs/DOC-1192, pp. 1-16, May 22, 2008.
Notice of Allowance Mailed Aug. 26, 2011 in Co-Pending U.S. Appl. No. 11/692,659 of Webman, E., et al., filed Mar. 28, 2007.
Advisory Action Mailed Aug. 1, 2011 in Co-Pending U.S. Appl. No. 11/692,659 of Webman, E., et al., filed Mar. 28, 2007.
Final Office Action Mailed Apr. 26, 2011 in Co-Pending U.S. Appl. No. 11/692,659 of Webman, E., et al., filed Mar. 28, 2007.
Non-Final Office Action Mailed Oct. 27, 2010 in Co-Pending U.S. Appl. No. 11/692,659 of Webman, E., et al., filed Mar. 28, 2007.
Final Office Action Mailed Nov. 9, 2010 in Co-Pending U.S. Appl. No. 11/692,683 of Webman, E., et al., filed Mar. 28, 2007.
Non-Final Office Action Mailed Sep. 15, 2011 in Co-Pending U.S. Appl. No. 12/713,744 of Leverett, B., et al., filed Feb. 26, 2010.
Notice of Allowance Mailed Dec. 23, 2010 in Co-Pending U.S. Appl. No. 11/692,668 of Webman, E., filed Mar. 28, 2007.
Notice of Allowance mailed Aug. 17, 2011 in Co-Pending U.S. Appl. No. 12/187,305 of Driscoll, A.S., et al., filed Aug. 6, 2008.
Non-Final Office Action Mailed Oct. 19, 2011 in Co-Pending U.S. Appl. No. 12/559,483 of Shah, D., et al., filed Sep. 14, 2009.
Notice of Allowance Mailed Nov. 17, 2011 in Co-Pending U.S. Appl. No. 11/692,659 of Webman, E., et al., filed Mar. 28, 2007.
Non-Final Office Action Mailed Oct. 27, 2011 in Co-Pending U.S. Appl. No. 12/610,231 of Condict, M.N., et al., filed Oct. 30, 2009.
Notice of Allowance mailed Nov. 15, 2011 in Co-Pending U.S. Appl. No. 12/187,305 of Driscoll, A.S., et al., filed Aug. 6, 2008.
Non-Final Office Action Mailed Jun. 15, 2012 in Co-Pending U.S. Appl. No. 12/610,234 of Condict, M.N., filed Oct. 30, 2009.
Notice of Allowance Mailed Jun. 7, 2012 in Co-Pending U.S. Appl. No. 11/692,683 of Webman, E., et al., filed Mar. 28, 2007.
Non-Final Office Action Mailed Dec. 27, 2011 in Co-Pending U.S. Appl. No. 11/692,683 of Webman, E., et al., filed Mar. 28, 2007.

Birman, K., et al., "Lightweight Casual and Atomic Group Multicast", ACM Transactions on Computer Systems, vol. 9, No. 3, Aug. 1991, pp. 272-314.

Final Office Action Mailed Feb. 23, 2012 in Co-Pending U.S. Appl. No. 12/713,744 of Leverett, B., et al., filed Feb. 26, 2010.

Final Office Action Mailed Apr. 12, 2012 in Co-Pending U.S. Appl. No. 12/559,483 of Shah, D., et al., filed Sep. 14, 2009.

Restriction Requirement Mailed Jul. 6, 2010 in Co-Pending U.S. Appl. No. 11/692,659 of Webman, E., et al., filed Mar. 28, 2007.

Non-Final Office Action Mailed Aug. 3, 2012 in Co-Pending U.S. Appl. No. 12/713,744 of Leverett, B., et al., filed Feb. 26, 2010.

Final Office Action Mailed Jun. 26, 2012 in Co-Pending U.S. Appl. No. 12/610,231 of Condict, M.N., et al., filed Oct. 30, 2009.

Advisory Action Mailed Sep. 6, 2012 in Co-Pending U.S. Appl. No. 12/610,231 of Condict, M.N., et al., filed Oct. 30, 2009.

Advisory Action Mailed May 7, 2012 in Co-Pending U.S. Appl. No. 12/713,744 of Leverett, B., et al., filed Feb. 26, 2010.

* cited by examiner

UNORDERED IDEMPOTENT REPLICATION OPERATIONS

FIELD OF THE INVENTION

At least one embodiment of the present invention pertains to data storage systems, and more particularly, to a technique for performing out-of-order logical replication of data.

BACKGROUND

A network storage system is a processing system that is used to store and retrieve data on behalf of one or more hosts on a network. A storage system operates on behalf of one or more hosts to store and manage data in a set of mass storage devices, such as magnetic or optical storage-based disks or tapes. Some storage systems are designed to service file-level requests from hosts, as is commonly the case with file servers used in a network attached storage (NAS) environment. Other storage systems are designed to service block-level requests from hosts, as with storage systems used in a storage area network (SAN) environment. Still other storage systems are capable of servicing both file-level requests and block-level requests, as is the case with certain storage servers made by NetApp, Inc. of Sunnyvale, Calif.

One common use of storage systems is data replication. Data replication is a technique for backing up data, where a given data set at a source is replicated at a destination, which is often geographically remote from the source. The replica data set created at the destination is called a "mirror" of the original data set. Typically replication involves the use of at least two storage systems, e.g., one at the source and another at the destination, which communicate with each other through a computer network or other type of data interconnect.

Replication can be done at a physical block level or at a logical block level. To understand the difference, consider that each data block in a given set of data, such as a file, can be represented by both a physical block, pointed to by a corresponding physical block pointer, and a logical block pointed to by a corresponding logical block pointer. These two blocks are actually the same data block. However, the physical block pointer indicates the actual physical location of the data block on a storage medium, whereas the logical block pointer indicates the logical position of the data block within the data set (e.g., a file) relative to other data blocks. When replication is performed at the physical block level, the replication process creates a replica at the destination storage system that has the identical structure of physical block pointers as the original data set at the source storage system. When replication is done at the logical block level, the replica at the destination storage system has the identical structure of logical block pointers as the original data set at the source storage system, but may (and typically does) have a different structure of physical block pointers than the original data set at the source storage system.

Conventional replication systems have a number of limitations. Replication at the physical block level requires that the destination storage system have the identical disk topology (or disk geometry) as the source storage system, whereas replication at the logical block level has certain performance issues. For example, replication of the physical block level cannot be performed between a source storage system and a destination storage system if they have different Redundant Array of Inexpensive Disk (RAID) configurations. In order to do logical replication, on the other hand, the file system of the source storage system is analyzed to determine changes that have occurred to the file system, and then those changes are transferred to the destination storage system in a particular order. This typically includes "walking" the directory trees at the source storage system to determine the changes to various file system objects within each directory tree, as well as identifying the changed file system object's location within the directory tree structure. The changes are then sent to the destination storage system in a certain order (e.g., directories before subdirectories, and subdirectories before files, etc.) so that the directory tree structure of the source storage system is preserved at the destination storage system. Updates to directories of the source file system are received and processed at the destination storage system before updates to the files in each of the directories can be received and processed. If updates to data in files are received before the updates to the directories that the files are stored in, then files are essentially orphaned because the destination server lacks adequate information as to in which directory the updates to files are to be stored. That is, updates to the data in the file cannot be processed before the directory referencing the file exists on the destination storage system.

The source storage system performs a first search through all the directories in the source storage system to figure out which directories have been updated, and then perform a second search within each directory to figure out which files have been updated in those directories. Moreover, additional searches are performed for file systems that have nested or hierarchical directory structures, such that higher-level directories are searched before lower-level directories (e.g., subdirectories), and so on. This analysis requires the source storage system to walk its way down from the top to the bottom of each of the directory trees of the source storage system before any updates to the file system in source storage system can be transferred to the destination storage system. Then, the updates are transferred to the destination storage system in order so that the destination storage system can properly process the updates to generate the replica file system in the destination storage system. This can take a significant amount of time and can impact performance in replication operations at the logical block level.

SUMMARY

Embodiments of the technique introduced here include a method and apparatus for replicating a file system at the logical block level in an unordered stream of individual data units. In at least certain embodiments, the replication operations include creating a snapshot of a file system of a source storage system, identifying changes in the file system since a previous replication operation by comparing the snapshot with a previous snapshot created during the earlier replication operation, and asynchronously transferring the identified changes to a destination storage system in an unordered stream of individual data units. Since the replication is performed at the logical block level, the replication can be performed without regard to either the differences in geometry of the physical persistent storage media of the source and destination storage systems or the differences in file system format of the source and destination storage systems.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus for performing out-of-order replication of a file system at the logical block level are described. For the purposes of this description, a file system is a structured (e.g., hierarchical) set of stored files, directories and/or other data containers. Note that references in this specification to "an embodiment", "one embodiment", or the like, mean that the particular feature, structure or characteristic being described is included in at least one embodiment of the present invention. Occurrences of such phrases in this specification do not necessarily all refer to the same embodiment; on the other hand, they are not necessarily mutually exclusive either.

In certain embodiments, the unique reference for each data block includes a physical volume block number (PVBN) of the data block and a virtual volume block number (VVBN) of the data block, which (in either case) is independent of the logical block number(s) of the data block. PVBNs and VVBNs are described further below. In certain embodiments, the data structure maintained by the destination storage system includes a mapping of source storage system PVBNs (or VVBNs) to corresponding destination storage system PVBNs (or VVBNs).

Figure 1:
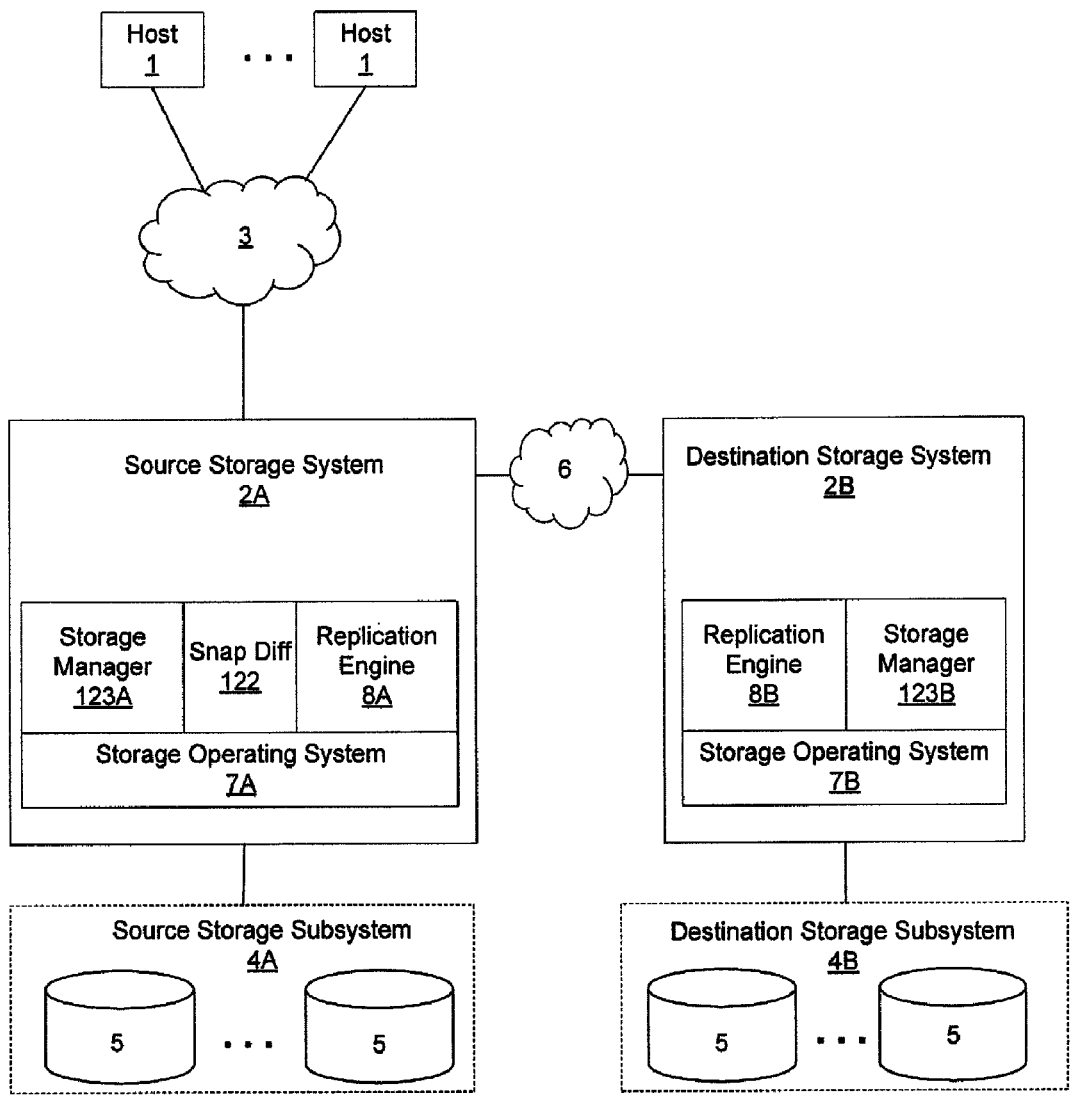
FIG. 1 depicts a configuration of network storage systems in which the techniques being introduced here can be implemented according to an illustrative embodiment.

FIG. 1 depicts a configuration of network storage systems in which the techniques being introduced here can be implemented according to an illustrative embodiment. In FIG. 1, a source storage system 2A is coupled to a source storage subsystem 4A and to a set of hosts 1 through an interconnect 3. The interconnect 3 may be, for example, a local area network (LAN), wide area network (WAN), metropolitan area network (MAN), global area network such as the Internet, a Fibre Channel fabric, or any combination of such interconnects. Each of the hosts 1 may be, for example, a conventional personal computer (PC), server-class computer, workstation, handheld computing/communication device, or other computing/communications device.

In one embodiment, source storage system 2A includes a storage operating system 7A, storage manager 123A, snapshot differential module 122, and replication engine 8A. Each of storage operating system 7A, storage manager 123A, snapshot differential module 122, and replication engine 8A are computer hardware components of the storage system including special purpose hardware circuitry (e.g., "hardwired") or general purpose hardware circuitry that is programmed with software and/or firmware, or any combination thereof. Storage of data in the source storage subsystem 4A is managed by storage manager 123A of source storage system 2A. Source storage system 2A and source storage subsystem 4A are collectively referred to as a source storage system. The storage manager 123A receives and responds to various read and write requests from the hosts 1, directed to data stored in or to be stored in storage subsystem 4A. Storage subsystem 4A includes a number of nonvolatile mass storage devices 5, which can be, for example, conventional magnetic or optical disks or tape drives; alternatively, they can be non-volatile solid-state memory, such as flash memory, or any combination of such devices. The mass storage devices 5 in storage subsystem 4A can be organized as a RAID group, in which case the storage controller 2 can access the storage subsystem 4 using a conventional RAID algorithm for redundancy.

Storage manager 123A processes write requests from hosts 1 and stores data to unused storage locations in mass storage devices 5 of the storage subsystem 4A. In one embodiment, the storage manager 123A is implemented as a "write anywhere" file system such as the proprietary Write Anywhere File Layout file (WAFL™) system developed by Network Appliance, Inc., Sunnyvale, Calif. WAFL systems are not constrained to write any particular data or metadata to a particular storage location or region. Rather, WAFL systems can write to any unallocated block on any available mass storage device and do not overwrite data on the devices. If a data block on disk is updated or modified with new data, the data block is thereafter stored (written) to a new location on disk instead of modifying the block in place to optimize write performance.

The storage manager 123A of source storage system 2A is responsible for managing storage of data in the source storage subsystem 4A, servicing requests from hosts 1, and performing various other types of storage related operations. In one embodiment, the storage manager 123A, the source replication engine 8A and the snapshot differential module 122 are logically on top of the storage operating system 7A. The source replication engine 8A operates in cooperation with a remote destination replication engine 8B, described below, to perform logical replication of data stored in the source storage subsystem 4A. Note that in other embodiments, one or both of the storage manager 123A, replication engine 8A and the snapshot differential module 122 may be implemented as elements within the storage operating system 7A.

The source storage system 2A is connected to a destination storage system 2B through an interconnect 6, for purposes of replicating data. Although illustrated as a direct connection, the interconnect 6 may include one or more intervening devices and/or may include one or more networks. In the illustrated embodiment, the destination storage system 2B includes a storage operating system 7B, replication engine 8B and a storage manager 123B. The storage manager 123B controls storage related operations on the destination storage system 2B. In one embodiment, the storage manager 123B and the destination replication engine 8B are logically on top of the storage operating system 7B. In other embodiments, the storage manager 123B and the destination replication engine 8B may be implemented as elements within storage operating system 7B. The destination storage system 2B and the destination storage subsystem 4B are collectively referred to as the destination storage system.

The destination replication engine 8B works in cooperation with the source replication engine 8A to replicate data from the source storage system to the destination storage system. In certain embodiments, the storage operating systems 7A and 7B, replication engines 8A and 8B, storage managers 123A and 123B, and snapshot differential module 122 are all implemented in the form of software. In other embodiments, however, any one or more of these elements may be implemented in hardware alone (e.g., specially-designed dedicated circuitry), firmware, or any combination of hardware, software and firmware.

Storage systems 2A and 2B each may be, for example, a storage system which provides file-level data access services to hosts 1, such as commonly done in a NAS environment, or block-level data access services such as commonly done in a SAN environment, or it may be capable of providing both file-level and block-level data access services to hosts 1. Further, although the storage systems 2 are illustrated as single units in FIG. 1, they can have a distributed architecture. For example, the storage systems 2 can be designed as physically separate network modules (e.g., "N-module") and data modules (e.g., "D-module") (not shown), which communicate with each other over a physical interconnect. Such an architecture allows convenient scaling, such as by deploying two or more N-modules and D-modules, all capable of communicating with each other over the interconnect.

Figure 2:
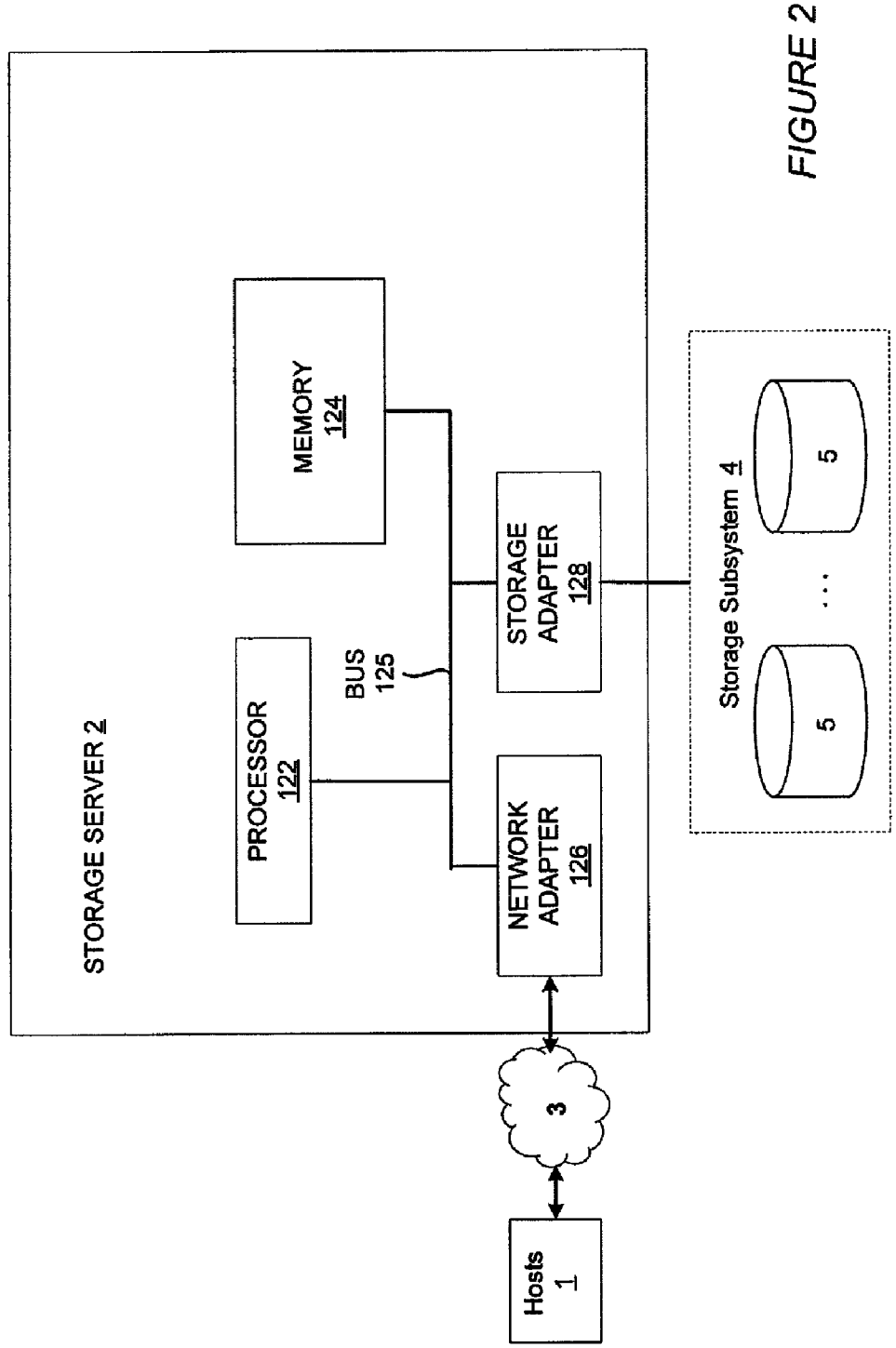
FIG. 2 is a high-level block diagram of an illustrative embodiment of a storage system architecture.

FIG. 2 is a high-level block diagram of an illustrative embodiment of a storage system architecture. The storage system 2 includes one or more processors 122 and memory 124 coupled to an interconnect bus 125. The interconnect bus 125 shown in FIG. 2 is an abstraction that represents any one or more separate physical interconnect buses, point-to-point connections, or both, connected by appropriate bridges, adapters, and/or controllers. The interconnect bus 125, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 122 is/are the central processing unit(s) (CPU) of the storage systems 2 and, therefore, control the overall operation of the storage systems 2. In certain embodiments, the processor(s) 122 accomplish this by executing software or firmware stored in memory 124. The processor(s) 122 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices. The memory 124 is or includes the main memory of the storage systems 2. The memory 124 represents any form of random access memory (RAM), read-only memory (ROM), flash memory, or the like, or any combination of such devices. Also connected to the processor(s) 122 through the interconnect bus 125 is a network adapter 126 and a storage adapter 128. The network adapter 126 provides the storage systems 2 with the ability to communicate with remote devices, such as hosts 1, over the interconnect 3 of FIG. 1, and may be, for example, an Ethernet adapter or Fibre Channel adapter. The storage adapter 126 allows the storage systems 2 to access storage subsystems 4A or 4B, and may be, for example, a Fibre Channel adapter or SCSI adapter.

Figure 3:
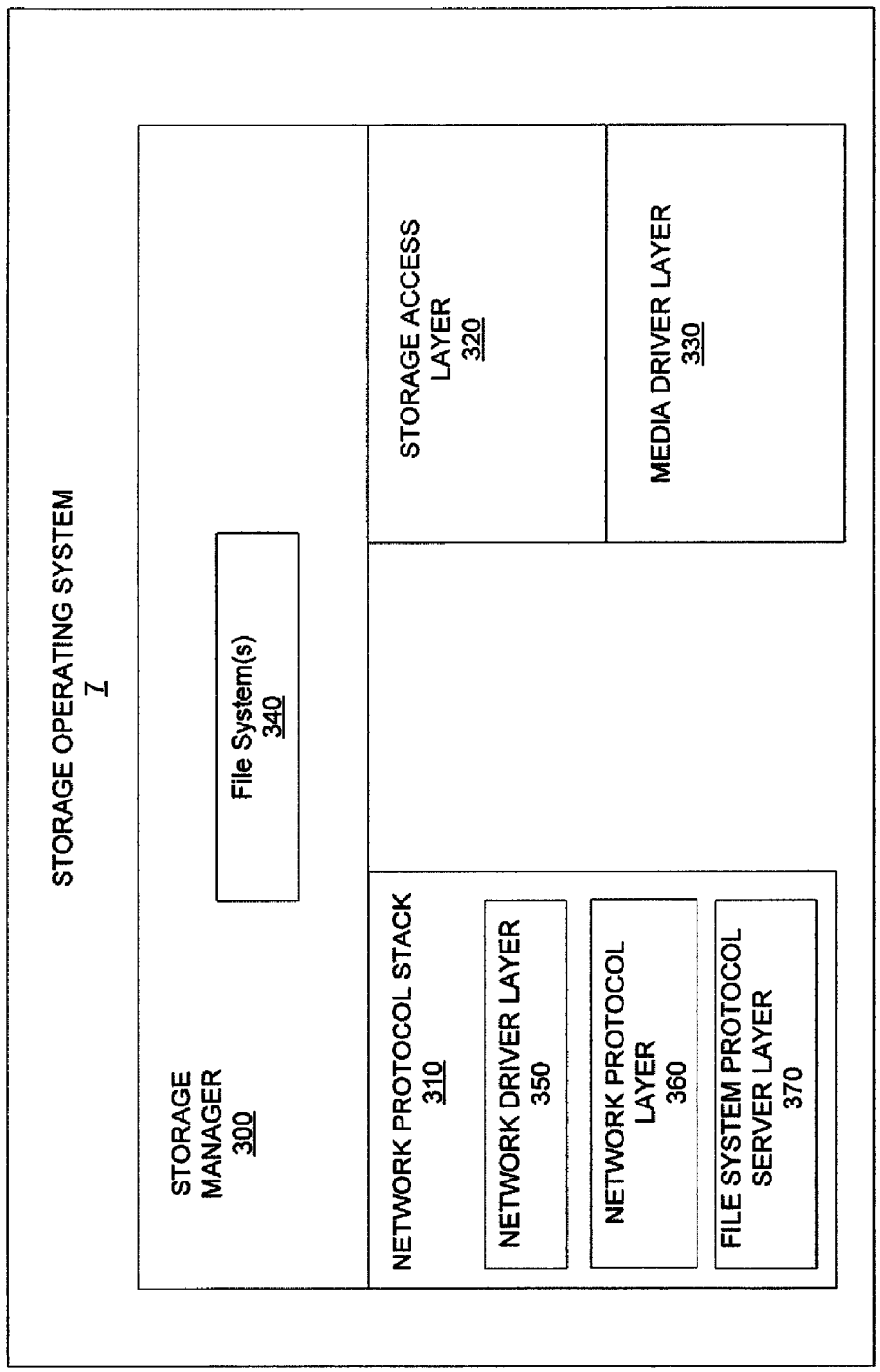
FIG. 3 is a block diagram of a storage operating system according to an illustrative embodiment.

FIG. 3 is a block diagram of a storage operating system according to an illustrative embodiment. As used herein, the term "storage operating system" generally refers to the computer-executable code operable on a computer to perform a storage function that manages data access. Storage operating system 7 can also be implemented as a microkernel, an application program operating over a general-purpose operating system such as UNIX® or Windows NT®, or as a general-purpose operating system configured for the storage applications as described herein. In the illustrated embodiment, the storage operating system includes a network protocol stack 310 having a series of software layers including a network driver layer 350 (e.g., an Ethernet driver), a network protocol layer 360 (e.g., an Internet Protocol layer and its supporting transport mechanisms: the TCP layer and the User Datagram Protocol layer), and a file system protocol server layer 370 (e.g., a CIFS server, a NFS server, etc.). In addition, the storage operating system 7 includes a storage access layer 320 that implements a storage media protocol such as a RAID protocol, and a media driver layer 330 that implements a storage media access protocol such as, for example, a Small Computer Systems Interface (SCSI) protocol. Any and all of the modules of FIG. 3 can be implemented as a separate hardware component. For example, the storage access layer 320 may alternatively be implemented as a parity protection RAID module and embodied as a separate hardware component such as a RAID controller. Bridging the storage media software layers with the network and file system protocol layers is the storage manager 123 that implements one or more file system(s) 340. For the purposes of this disclosure, a file system is a structured (e.g., hierarchical) set of stored files, directories and/or other data containers. In one embodiment, the storage manager 123 implements data layout algorithms that improve read and write performance to the mass storage media 5, such as WAFL systems discussed above.

Figure 4:
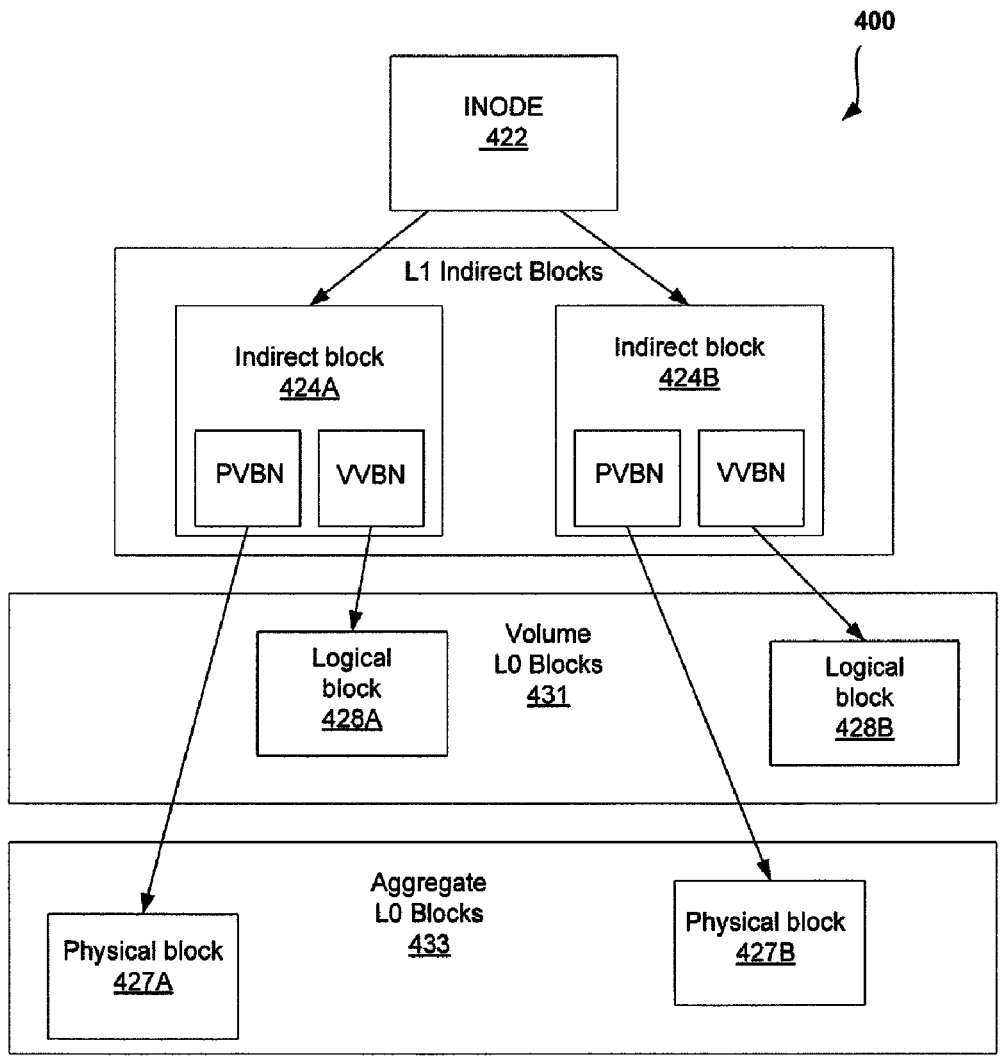
FIG. 4 depicts a buffer tree of a file according to an illustrative embodiment.
Figure 5:
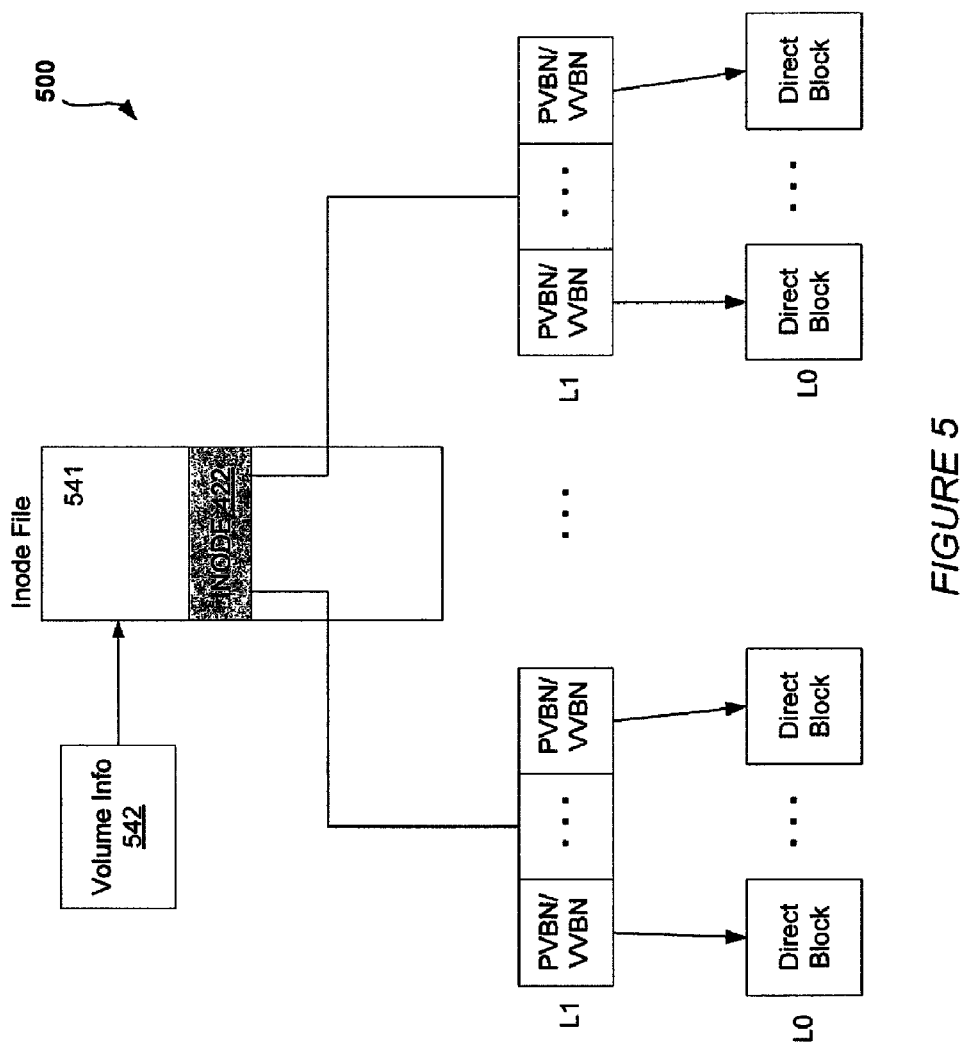
FIG. 5 depicts a buffer tree including an inode file according to an illustrative embodiment.

It is useful now to consider how data can be structured and organized by storage systems 2A and 2B in certain embodiments. Reference is now made to FIGS. 4 and 5 in this regard. In at least one embodiment, data is stored in the form of volumes, where each volume contains one or more directories, subdirectories, and/or files. The term "aggregate" is used to refer to a pool of physical storage, which combines one or more physical mass storage devices (e.g., disks) or parts thereof, into a single storage object. An aggregate also contains or provides storage for one or more other data sets at a higher-level of abstraction, such as volumes. A "volume" is a set of stored data associated with a collection of mass storage devices, such as disks, which obtains its storage from (i.e., is contained within) an aggregate, and which is managed as an independent administrative unit, such as a complete file system. Each volume can contain data in the form of one or more directories, subdirectories, and/or files.

In certain embodiments, each aggregate uses a PVBN space that defines the physical storage space of blocks provided by the storage devices of the physical volume, and likewise, each volume uses a VVBN space to organize those blocks into one or more higher-level objects, such as directories, subdirectories, and files. A PVBN, therefore, is an address of a physical block in the aggregate and a VVBN is an address of a block in a volume (the same block as referenced by the corresponding PVBN), i.e., the offset of the block within the volume. Knowledge of all of the VVBNs and PVBNs is maintained by the storage manager 300 in each storage system 2. Each VVBN space is an independent set of values that corresponds to locations within a directory or file, which are translated to device block numbers (DBNs) on the physical storage device. Each volume can be "mingled" with other volumes onto a common set of physical storage in the aggregate by the storage manager 300.

In addition, data within the storage system is managed at a logical block level. At the logical block level, the storage manager maintains a logical block number (LBN) for each data block. If the storage system stores data in the form of files, the LBNs are called file block numbers (FBNs). Each FBN indicates the logical position of the block within a file, relative to other blocks in the file, i.e., the offset of the block within the file. For example, FBN 0 represents the first logical block in a particular file, while FBN 1 represents the second logical block in the file, and so forth. Note that the PVBN and VVBN of a data block are independent of the FBN(s) that refer to that block. In one embodiment, the FBN of a block of data at the logical block level is assigned to a PVBN-VVBN pair.

In certain embodiments, each file is represented in the storage system in the form of a hierarchical structure called a "buffer tree." As used herein, the term buffer tree is defined as a hierarchical metadata structure containing references (or pointers) to logic blocks of data in the file system. A buffer tree is a hierarchical structure which used to store file data as well as metadata about a file, including pointers for use in locating the data blocks for the file. A buffer tree includes one or more levels of indirect blocks (called "L1 blocks", "L2 blocks", etc.), each of which contains one or more pointers to lower-level indirect blocks and/or to the direct blocks (called "L0 blocks") of the file. All of the data in the file is stored only at the lowest level (L0) blocks. The root of a buffer tree is the "inode" of the file. An inode is a metadata container that is used to store metadata about the file, such as ownership, access permissions, file size, file type, and pointers to the highest-level of indirect blocks for the file. Each file has its own inode. The inode is stored in a separate inode file, which may itself be structured as a buffer tree. In hierarchical (or nested) directory file systems, this essentially results in buffer trees within buffer trees, where subdirectories are nested within higher-level directories and entries of the directories point to files, which also have their own buffer trees of indirect and direct blocks. Directory entries include the name of a file in the file system, and directories are said to point to (reference) that file. Alternatively, a directory entry can point to another directory in the file system. In such a case, the directory with the entry is said to be the "parent directory," while the directory that is referenced by the directory entry is said to be the "child directory" or "subdirectory."

FIG. 4 depicts a buffer tree of a file according to an illustrative embodiment. In the illustrated embodiment, a file is assigned an inode 422, which references Level 1 (L1) indirect blocks 424A and 424B. Each indirect block 424 stores at least one PVBN and a corresponding VVBN for each PVBN. There is a one-to-one mapping between each VVBN and PVBN. Note that a PVBN is a block number in an aggregate (i.e., offset from the beginning of the storage locations in an aggregate) and a VVBN is a block number in a volume (offset from the beginning of the storage locations in a volume); however, there is only one copy of the L0 data block physically stored in the physical mass storage of the storage system. Also, to simplify description, only one PVBN-VVBN pair is shown in each indirect block 424 in FIG. 4; however, an actual implementation would likely include multiple/many PVBN-VVBN pairs in each indirect block 424. Each PVBN references a physical block 427A and 427B, respectively, in the storage device (i.e., in the aggregate L0 blocks 433) and the corresponding VVBN references a virtual volume block 428A and 428B, respectively, in the storage device (i.e., in the volume L0 blocks 431). In addition, volumes can also be represented by files called "container files." In such a case, the VVBN references a block number offset from the beginning of the container file representing the volume. Physical blocks 427 and volume blocks 428 are actually the same L0 data for any particular PVBN-VVBN pair; however, they are accessed in different ways: the PVBN is accessed directly in the aggregate 30, while the VVBN is accessed virtually via the container file representing the volume.

FIG. 5 depicts a buffer tree including an inode file according to an illustrative embodiment. In FIG. 5, for each volume managed by the storage system 2, the inodes of the files and directories in that volume are stored in an inode file 541. A separate inode file 541 is maintained for each volume. An inode file 422, in one embodiment, is a data structure representing a master list of file system objects (e.g., directories, subdirectories and files) of the file system in the storage system and each inode entry identifies a particular file system object within the file system. Each inode 422 in the inode file 541 is the root of a buffer tree 500 of the file corresponding to the inode 422. The location of the inode file 541 for each volume is stored in a volume information ("VolumeInfo") block 542 associated with that volume. The VolumeInfo block 542 is a metadata container that contains metadata that applies to the volume as a whole. Examples of such metadata include, for example, the volume's name, type, size, any space guarantees to apply to the volume, and the VVBN of the inode file of the volume.

For various reasons, it may be desirable to maintain a replica of the data set of the source storage system. For example, in the event of a power failure or other system crash, data lost at the source storage system can be recovered from the replica stored in the destination storage system. In at least one embodiment, the data set is a file system of the storage system and replication is performed using snapshots. A snapshot is a persistent image (usually read-only) of the file system at a point in time and can be generated by the source snapshot differential module 122. A first snapshot of the file system of the source storage system is created by the differential source module 122 at some point in time, and this snapshot of the file system is referred to as the baseline snapshot. This baseline snapshot is then handed off to the source replication engine 8A for replication operations. After the baseline snapshot of the file system is generated by the source differential module 122, subsequently, from time to time, additional snapshots of the file system are generated. At some later time, the source replication engine 8A executes another replication operation (which may be at the request of the destination replication engine 8B). To do so, the source replication engine 8A needs to be updated with the changes to the file system of the source storage system since a previous replication operation was performed to make sure all changes in the file system of the source storage system are replicated at the destination storage system. The snapshot differential module 122 compares the most recent snapshot of the file system of the source storage system to the snapshot of a previous replication operation to determine differences between a recent snapshot and the previous snapshot. The snapshot differential module 122 identifies any data that has been added or modified since the previous snapshot operation, and sends those additions or modifications to the source replication engine 8A for replication.

One embodiment described herein overcomes some of the disadvantages of replication operations in prior storage systems by performing replication of the file system of the source storage system at the logical block level. Performing replication at the logical block level gives a storage system more flexibility and efficiency in replication operations, allowing for transferring modifications or additions of the file system to the destination storage system in an unordered stream of individual data units. For the purposes of this description, the term unordered means out-of-order or not necessarily in any specified, particular, or predetermined order. Further, the modifications or additions to the file system can be sent to the destination storage system at the time the changes are identified without having to first perform walking of the directory trees of the source storage system to determine the directory structure of the source storage system. In addition, the modifications are transferred to the destination asynchronously meaning that changes to the source storage system are not immediately reflected in the destination storage system. Rather, the transfers are perfotined between one or more snapshots taken of the file system over time.

Figure 6A:
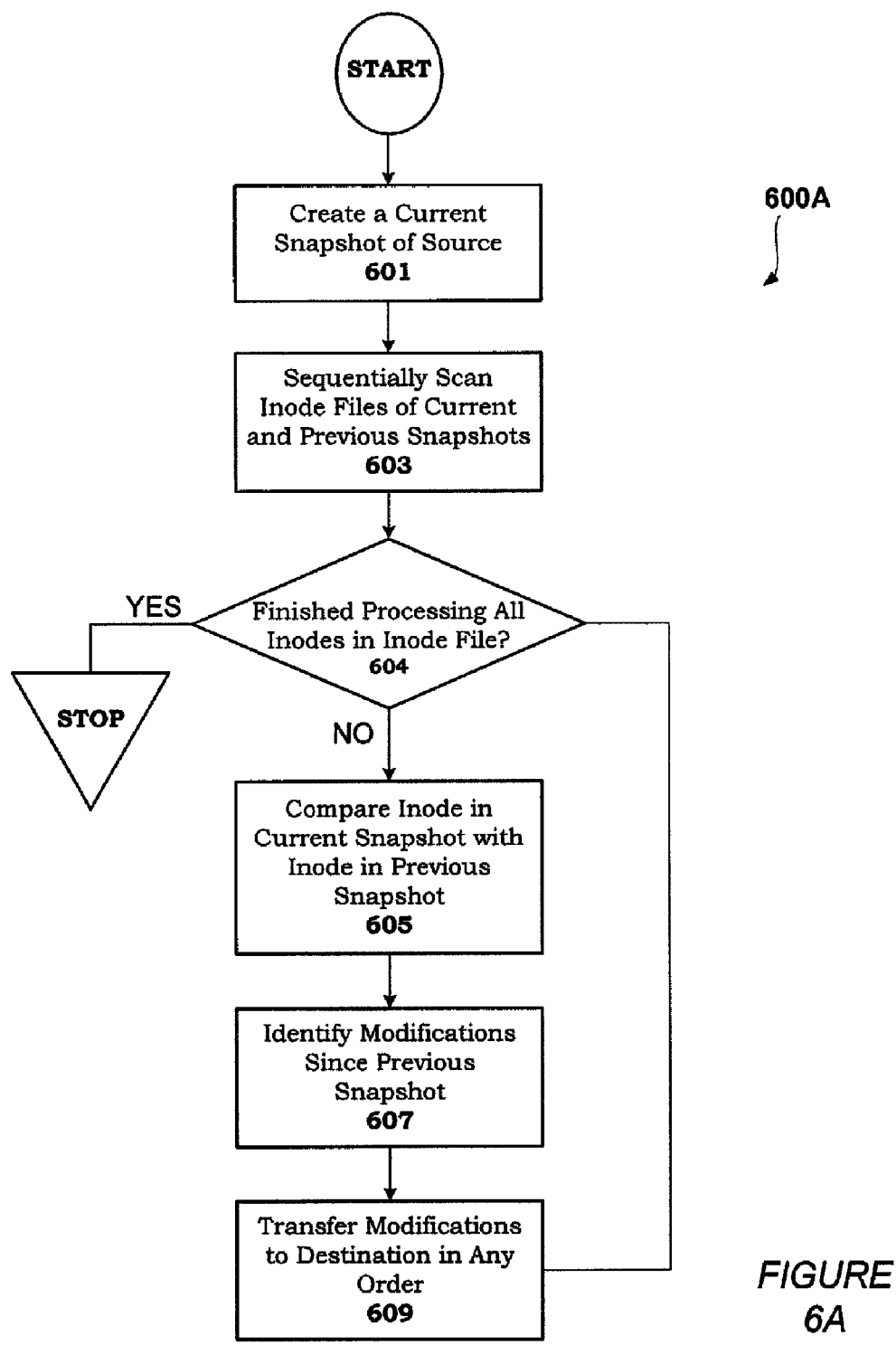
FIG. 6A depicts a process for replicating a file system at the logical block level on the source storage system side according to an illustrative embodiment.

FIG. 6A depicts a process for replicating a file system at the logical block level on the source storage system side according to an illustrative embodiment. Process 600A begins at operation 601 by creating a snapshot of the file system of the source storage system at a point in time. In one embodiment, this is performed by a snapshot differential module 122 in the source storage system 2A. Once the snapshot is created, it can then be compared to a previous snapshot to determine modifications and additions to the file system of the source storage system since the previous replication operation was performed. Process 600A continues with sequentially scanning the inode files of the current snapshot and a previous snapshot of the source file system in lockstep (operation 603). Each inode in the inode file is scanned in sequence meaning that the inodes are analyzed in inode file order. At operation 604, it is determined whether all the inodes in the inode file have been processed. If so, this completes process 600A. If not, control flows to operation 605 where each inode entry in the current snapshot is compared to the corresponding inode entry in the inode file of the previous snapshot to identify changes to the file system since the previous snapshot was taken.

As discussed above, an inode file is a data structure representing a master list of file system objects, and each entry of the inode file is an inode that identifies a particular file system object within the file system. File system objects can be files, directories, and/or sub-directories of the file system. File system object inodes are arranged sequentially in the inode file, and a file system object's position in the inode file is given by its inode number. For directory entries, each entry includes the name of the file the directory entry references and the file's inode number. In addition, a directory has its own inode and inode number. An inode includes a master location catalog for the file, directory, or other file system object and various bits of information about the file system object called meta-data. The metadata includes, for example, the file system object's creation date, security information such as the file system object's owner and/or protection levels, and its size. The metadata also includes a "type" designation to identify whether the file system object is one of the following types: 1) a "file;" 2) a "directory;" 3) "unused;" or 4) "not yet known."

Importantly, the metadata also includes the "generation number" of the file system object. As time goes by, file system object is created or deleted, and slots in the inode file are recycled. When a file system object is created, its inode is given a new generation number, which is guaranteed to be different from (e.g., larger than) the previous file system object at that inode number. If repeated accesses are made to the file system object by its inode number (e.g., from clients, applications, etc.), the generation number can be checked to avoid inadvertently accessing a different file system object after the original file system object was deleted. The metadata also includes "parent information," which is the inode number of the file system object's parent directory. A file system object can have multiple parent directories.

At operation 607, the modifications to the file system of the source storage system 2A since the previous snapshot are identified based on results of the comparison in operation 605. These modifications are replicated in the destination storage system 2B at the logical block level. The modifications can then be transferred to the destination storage system as an unordered stream of individual data units without regard to the data organization of the destination storage system (operation 609). Since the file system is being replicated at the logical block level, it does not matter whether the destination server has different physical storage geometry than the source storage system. For example, the source storage system can be implemented in a RAID 5 configuration, whereas the destination can be RAID 3 or RAID 7, and so on. In addition, it does not matter that the destination storage system has a different file system format than the source storage system. The logical replication operations described herein allow for replication regardless of the organization of data between the source and destination storage systems and can be done in any order as will be discussed infra. This can be accomplished by preserving the inode file of the source storage system 2A in a replica inode file in the destination storage system 2B.

Process 600A continues with operation 609 by transferring data representing the identified modifications in the one or more file system objects of the file system to the destination storage system in any order. In one embodiment, the transfers occur in a single pass through the inode file without having to first determine the directory tree structure of the file system. The inode files are scanned sequentially in inode file order from the beginning to the end of the inode file in a single pass. This is an unordered replication operation, so the transfers are occurring while any remaining inode entries are still being sequentially scanned. The inode file is scanned only once, and whenever changes to any file system object of the file system of the source storage system are detected, those changes can be immediately transferred to the destination storage system upon detection. It does not matter the order in which the modifications are transferred to the destination storage system since the replication is being performed at the logical block level. For example, if the changes to a file are discovered in the source inode file before changes to the directory in which the file is located are discovered, those changes may nevertheless be transferred to the destination storage system 2B. This is allowed because the inode file of the source storage system is preserved in the replica inode file at the destination. As will be discussed further infra, as long as the inode entries in each of the inode files of the source and destination storage systems 2 are matched, it does not matter what order the file system objects are transferred from the source storage system 2A to the destination storage system 2B. The replica inode file at the destination storage system 2B provides the "road map" showing how to reconstruct (re-order) the file system objects once they are received at the destination storage system 2B. Therefore, files can be transferred before the directories in which they are located, sub-directories can be transferred before the directories in which they are located, files can be transferred before their associated metadata describing the files, and file blocks of files can be transferred in any order. In addition, it is not necessary to wait for the destination to acknowledge that it has processed a previously transferred modification before the source transfers the next identified modification. That is, it is not necessary to serialize the data flow. One transfer is not required to finish before a subsequent transfer can take place providing additional performance due to the unordered replication operations disclosed herein. This completes process 600A.

A replication operation transfers information from a source file system to the replica destination file system. In one embodiment, a replication operation includes data operations, directory operations, and inode operations. A "data operation" transfers 1) a block of file data, 2) the inode number of the block of data, 3) the generation number of the file, and 4) the position of the block within the file (e.g., FBN). A "directory operation" transfers 1) the inode number of the directory, 2) the generation number of the directory, and 3) enough information to reconstitute an entry in that directory including: 1) the name; 2) inode number; and 3) generation number of the file system object the directory entry points to. Finally, an "inode operation" transfers 1) the meta-data of an inode and 2) its inode number. To perform a replication of an entire file system, the source storage system sends a sequence of data operations, directory operations, and inode operations to the destination, which is expected to process the operations and send acknowledgments to the source.

A replication of a file system may be either an "initialization", in which the destination file system starts from scratch with no files or directories, or it may be an "update", in which the destination file system already has some files and directories from an earlier replication operation of an earlier version of the source. In an update, the source file system doesn't need to send every file and directory to the destination; rather, it sends only the changes that have taken place since the earlier version was replicated. In an update, an inode operation may be used to indicate that a file has been deleted, and also possibly that another file has been created at the same inode number. If the type changes from "file" or "directory" to "unused", there has been a deletion; if the generation number changes, there has been a deletion and a subsequent creation. We will call the latter case a "replacement".

Figure 6B:
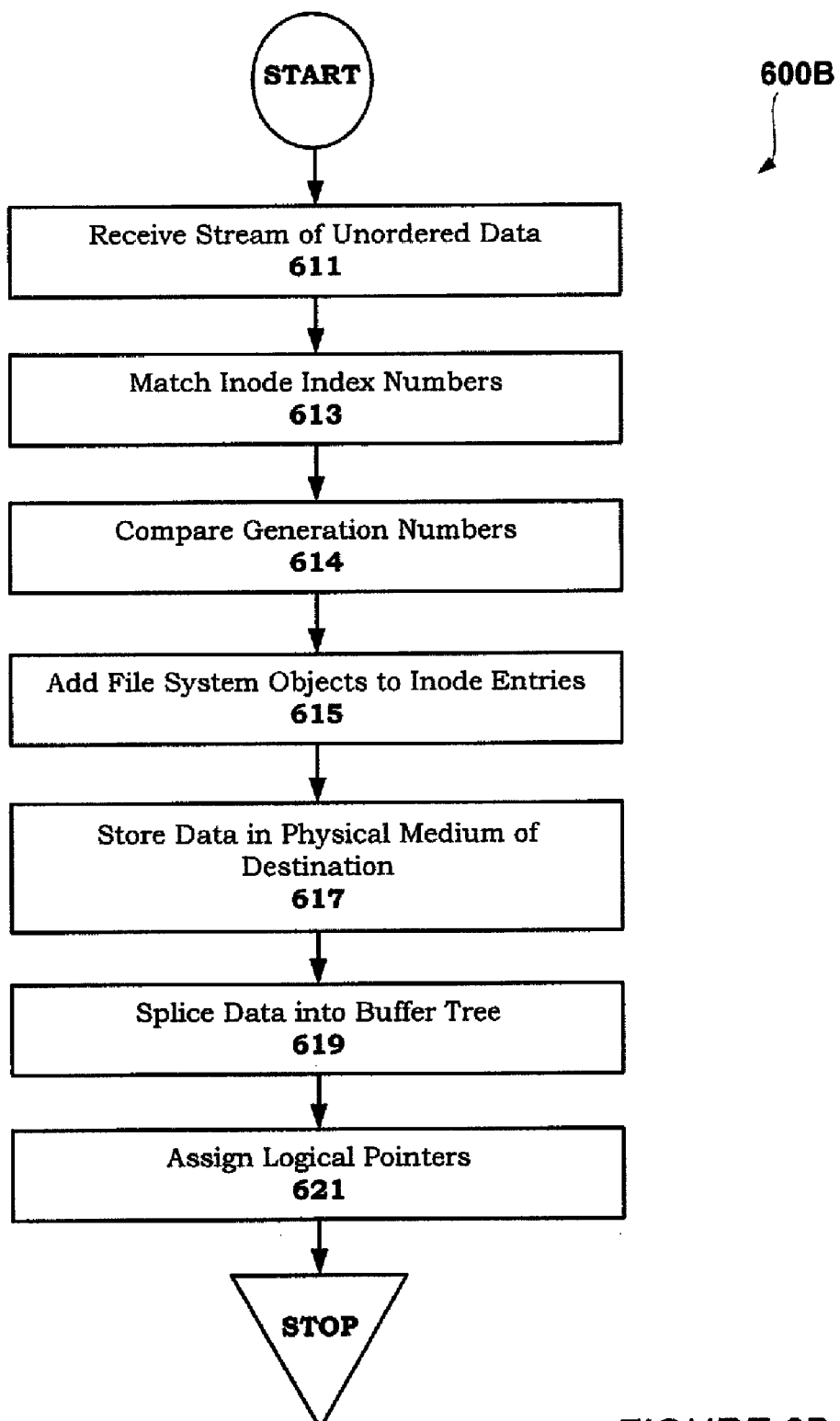
FIG. 6B depicts a process for replicating a file system at the logical block level on the destination storage system side according to an illustrative embodiment.

FIG. 6B depicts a process for replicating a file system at the logical block level on the destination storage system side according to an illustrative embodiment. Process 600B begins at operation 611 by receiving, at the destination storage system 2B, the unordered stream of individual data units transferred from the source storage system. The unordered stream of individual data includes additions, deletions or modifications to one or more file system objects of the source storage system 2A since a previous replication operation was performed. As discussed above, the file system objects can be any one or more of directories, sub-directories, or files of the file system in the source storage system 2A. The changes to the file system objects of the source storage system 2A are then replicated at the destination storage system 2B at a logical block level using the unordered stream of individual data units to be described infra. The replication operation is performed without regard to the differences in the organization of the data between the source storage system 2A and the destination storage system 2B. These differences can include differences in the geometry of the physical persistent storage of the source and destination storage systems 2 and/or differences in the file system format of the source and destination storage systems 2.

Process 600B continues with operation 613 where the inode numbers assigned to the file system objects that have been changed in the inode file of the source storage system 2A are matched to the corresponding inode number in the replica inode file at the destination storage system 2A. After the matching inode numbers are found, the generation numbers of the file system objects are compared to determine if the replication operation is an addition or modification (replacement) of the file system object at the destination storage system 2A (operation 614). If the generation number corresponding to a file system object that has been changed in the unordered stream of individual data units matches the generation number associated with the inode entry in the replica inode file at the destination storage system 2A, this indicates that the replication operation is an "addition" of the file system object to the destination. Accordingly, the file system object that has been changed is added to the appropriate inode entry in the replica inode file at the destination storage system 2A so that the inode number of the inode file of the source storage system 2A is preserved in the replica inode file of the destination storage system 2A (operation 615). If the generation number does not match the generation number associated with the inode entry in the replica inode file at the destination storage system 2A, this indicates that the replication operation is a "replacement" of the file system object at the destination. As discussed above, a deletion operation is indicated by changing the "type" designation in the file system object's metadata to "unused."

After the inode entries are matched and the generation numbers are compared, the data associated with the file system objects that have been changed is stored in unused blocks of physical persistent storage in the destination storage system 2A (operation 617). One advantage of embodiments described herein is that the modified data can be stored in any unused location at the destination storage system 2A and it does not matter where. This is because the data replication operation is at the logical block level, and the location of the block in physical storage is irrelevant as long as the appropriate pointers in the logical file system structure are properly updated as will now be discussed. Process 600B continues with operation 619, where the buffer tree representing the logical block structure of the file system at the destination storage system 2A is updated to point to the data of the one or more modified file system objects stored in the unused block of physical persistent storage of the destination storage system 2A. In one embodiment, this includes updating the lowest-level indirect block in the buffer tree with a pointer to the data in the file system objects that have been changed and storing the lowest-level indirect block to a different unused block of data in the physical persistent storage of the destination storage system 2A. This process is repeated all the way up the buffer tree until the highest-level indirect block is reached and all the pointers in the buffer tree appropriately reference the newly stored blocks of data representing the modified file system objects in physical persistent storage of the destination storage system 2A. This process is called "splicing" a block of data into the buffer tree. Process 600B continues with operation 621 where logical block pointers in the inode file are assigned to the highest-level indirect block referencing the data of the file system objects that have been changed. This is the logical block level to physical block level mapping that enables the changes in the file system of the source storage system 2A to be replicated out-of-order in the destination storage system 2B. This completes process 600B.

Figure 7A:
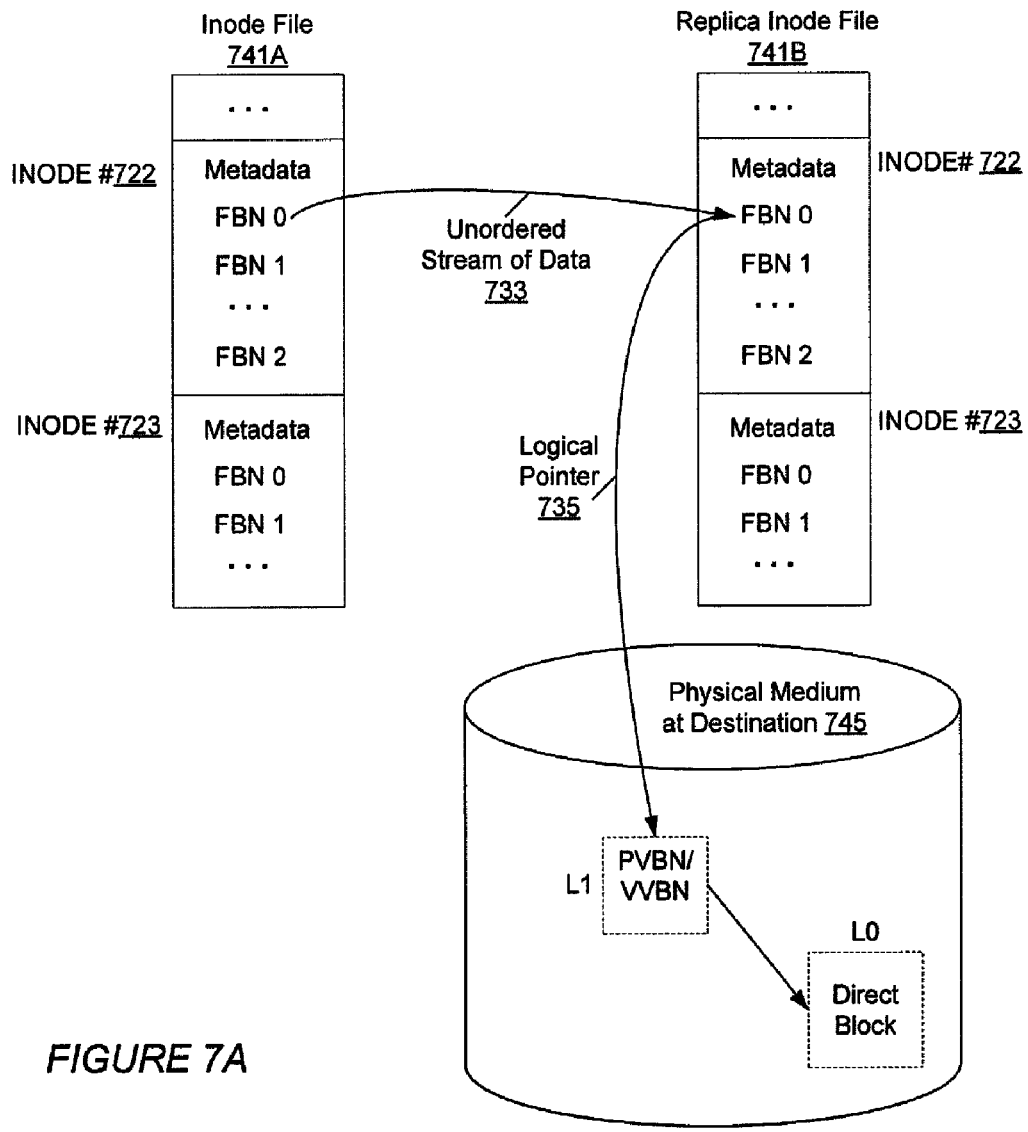
FIG. 7A depicts replicating a file block at the logical block level according to an illustrative embodiment.

In the case of files, the logical block pointers assigned to the highest-level indirect blocks include the FBNs in the inode file. The FBNs are assigned to their respective highest-level indirect block in the buffer tree of the file referencing the appropriate modified file system objects stored in the physical persistent storage medium of the destination storage system 2A. This is shown in FIG. 7A, which depicts replicating a file block at the logical block level according to an illustrative embodiment. Inode file 741A is the inode file at the source storage system 2A that is replicated in replica inode file 741B at the destination storage system 2B. Each inode entry represents a file (or a directory to be discussed infra) and is the root of the buffer tree for that file. In FIG. 7A, inode file 741A includes a file at inode number 722 with file blocks FBN 0 through FBN 2. Likewise, replica inode file 741B includes the corresponding replicated file at inode number 722 with file blocks FBN 0 through FBN2. In the illustrated embodiment, FBN 0 is the file block that is replicated by transferring an unordered stream of individual data units 733 from the inode file 741A of the source storage system 2A to the destination storage system 2B.

When the file system object being replicated is a file, in one embodiment a "data operation" is performed. In a data operation, the unordered stream of individual data units 733 includes: 1) the FBN of the file block being replicated; 2) the corresponding inode number for the data block at FBN 0; 3) the block of data corresponding to FBN 0 for that file; and 4) the generation number of the file. In the case of FBN 0, the unordered stream 733 includes FBN 0, inode number 722, the block of data corresponding to FBN 0; and the generation number of the file. When the unordered stream 733 reaches the destination storage system 2B, FBN 0 is assigned to the corresponding inode number 722 in the replica inode file 741B so that the inode number of FBN 0 in the source storage system 2A is preserved in the replica inode file 741B at the destination storage server 2B. The block of data corresponding to FBN 0 is then stored at an unused block of data in the physical persistent storage medium 745 of the destination storage server 2B. In the illustrated embodiment, the block of data is stored at direct block L0. Then, the data at direct block L0 is spliced into the buffer tree. This includes updating at least one indirect block (in this case L1) in the buffer tree to point to the data of direct block L0. In one embodiment, this is accomplished by storing the indirect block containing the pointer to direct block L0 to a different unused block of data in the physical persistent storage medium 745 of the destination storage server 2B. As shown, newly stored PVBN/VVBN block L1 references direct block L0.

After the direct block L0 is spliced into the buffer tree, FBN 0 is assigned to the highest-level indirect block of the buffer tree using a logical pointer 735. In this case, logical pointer 735 references PVBN/VVBN block L1, since this is the only indirect block in the illustrated embodiment. However, as discussed above, alternate embodiments can include any number of indirect blocks in the buffer tree, the highest of which is assigned to FBN 0 using logical pointer 735.

Figure 7B:
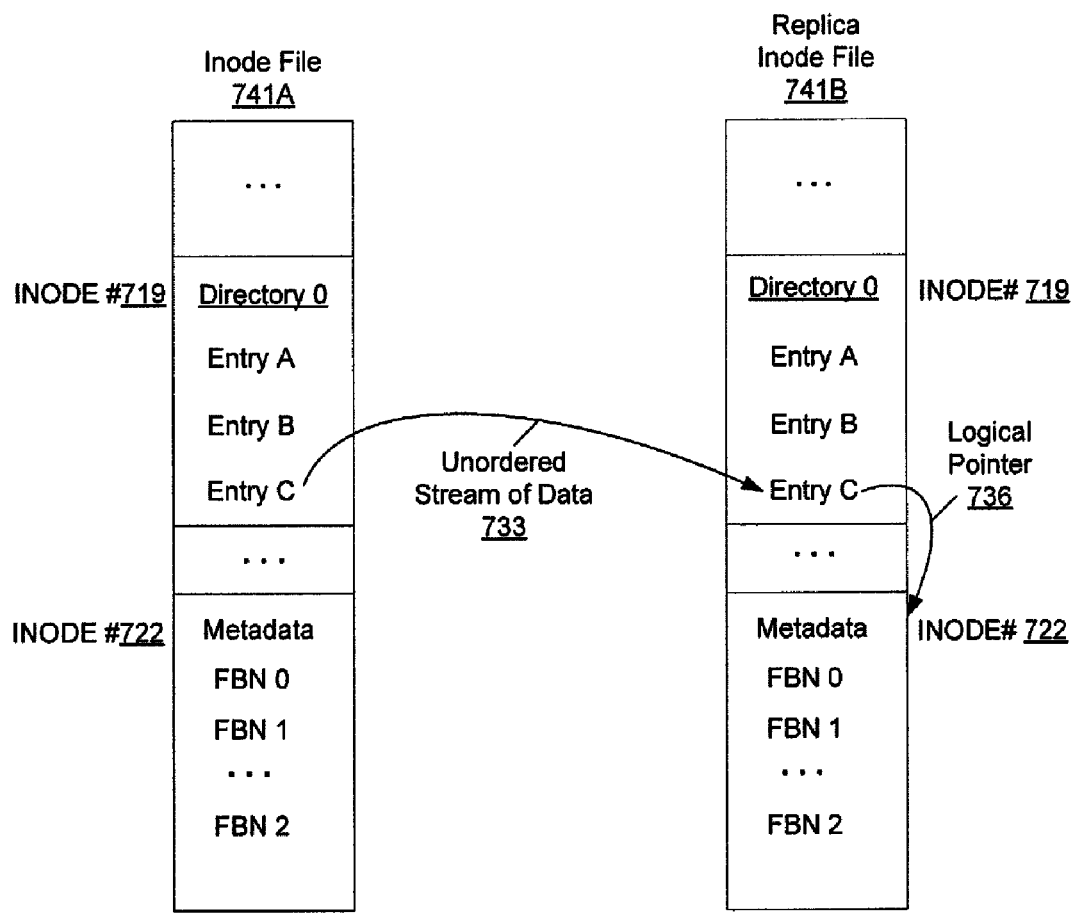
FIG. 7B depicts replicating a directory at the logical block level according to an illustrative embodiment.

FIG. 7B depicts replicating a directory at the logical block level according to an illustrative embodiment. Inode file 741A is the inode file at the source storage system 2A that is replicated in replica inode file 741B at the destination storage system 2B. Inode file 741A includes directory 0 located at inode number 719 and entries A, B and C of directory 0. Likewise, replica inode file 741E at the destination storage server 2B includes directory 0 located at inode number 719 and entries A, B and C of directory 0. In the illustrated embodiment, directory 0 is replicated by transferring an unordered stream of individual data units 733 from the inode file 741A of the source storage system 2A to the destination storage system 2B.

When the file system object being replicated is a directory or subdirectory, in one embodiment a "directory operation" is performed. In a directory operation, the unordered stream of individual data units 733 includes the directory/subdirectory entry that has changed in the source file system including: 1) the inode number of the directory (#719 in the illustrated embodiment); 2) the generation number of the directory; 3) the name of the file system object referenced by the directory/subdirectory entry (logical pointer 736 in the illustrated embodiment); 4) the inode number of the file system object referenced by the directory/subdirectory entry; and 5) the generation number of the file system object referenced by the directory/subdirectory entry. Each directory entry includes the name of the file system object referenced by the directory/subdirectory entry. This is shown as logical pointer 736 in FIG. 7B. In one embodiment, the logical pointer When the unordered stream 733 reaches the destination storage system 2B, directory 0 is assigned to the inode number in the replica inode file 741B corresponding to the inode number 719 so that the inode number of directory 0 in the source storage system 2A is preserved in the replica inode file 741B at the destination storage server 2B. The directory entry A of directory 0 is then stored at an unused block of data in the physical persistent storage medium 745 of the destination storage server 2B. As discussed above, this directory entry includes the name, inode number and generation number of the file system object referenced by the entry.

Figure 8A:
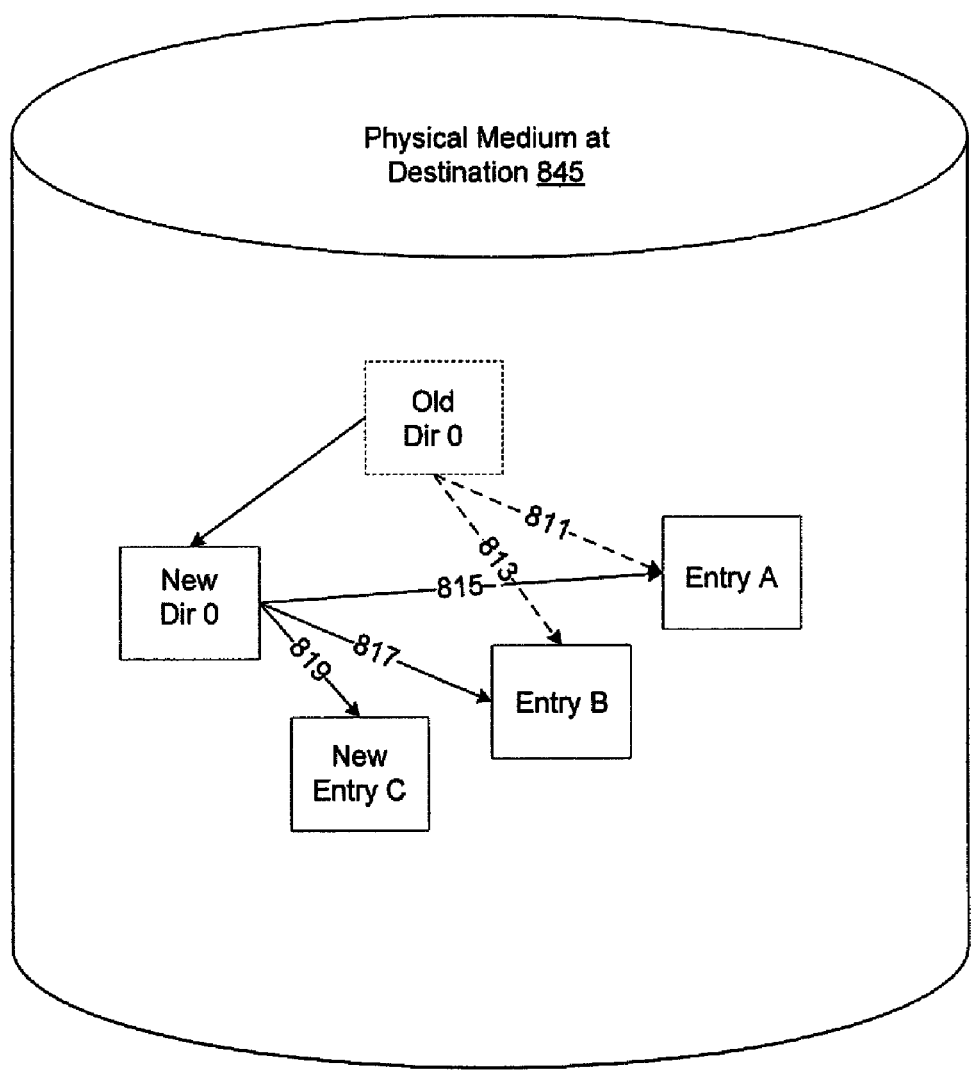
FIG. 8A depicts adding a new directory entry during a replication operation according to an illustrative embodiment.

When the generation number of the directory matches the generation number at the corresponding inode number of the replica inode file 741B, the replication operation is adding a directory entry to the directory. In such a case, the directory entry is added to the inode file 741A of the source storage system, and, in a subsequent replication operation, the directory entry is transferred to the destination storage system 2B. FIG. 8A depicts adding a new directory entry during a replication operation according to an illustrative embodiment. In FIG. 8A, new entry C has been stored to an unused block of data in the physical persistent storage medium 845 at the destination storage system 2B. After the new entry is stored, the buffer tree corresponding to directory 0 is updated to reference the new directory entry C. This is accomplished by storing a new directory 0 to a different unused block of data in the physical persistent storage medium 845 with updated pointers including a pointer to new entry C. Referring to FIG. 8A, before new entry C was stored, old directory 0 included pointers 811 and 813 to entries A and B, respectively. After entry C is added, new directory 0 is stored at an unused block of data in the physical medium 845 with updated pointers 815, 817 and 819 referencing entries A, B and C, respectively.

Figure 8B:
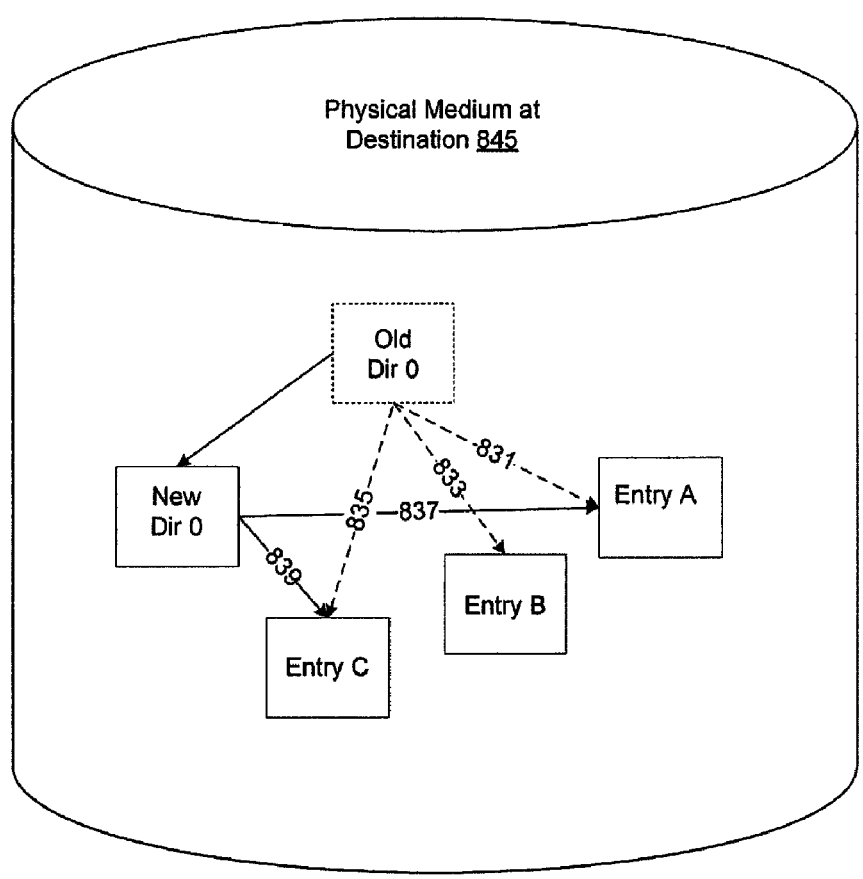
FIG. 8B depicts deleting a directory entry during a replication operation according to an illustrative embodiment.

In the case where a directory entry was deleted since a previous replication of the file system of the source storage system 2A, the directory entry is removed from the inode file 741A of the source storage system, and, in a subsequent replication operation, the name of the directory entry that was deleted is transferred to the destination storage system 2B in the unordered stream 735. FIG. 8B depicts deleting a directory entry during a replication operation according to an illustrative embodiment. In FIG. 8B, entry B has been deleted. After entry B is deleted, the buffer tree corresponding to directory 0 is updated. This is accomplished by storing a new directory 0 to an unused block of data in the physical storage medium 845 of the destination storage system 2B. In this case; however, the new directory 0 does not reference the deleted entry B. Old directory 0 included pointers 831, 833 and 835 referencing entries A, B and C, respectively. New directory 0 includes pointers 837 and 839 referencing entries A and C only, but not referencing deleted entry B. Note, deleted entry B is not "deleted" from the physical medium 845; rather, entry B is de-referenced meaning that for all practical purposes, entry B is deleted even though there is no operation to modify the data block in physical medium 845.

Figure 8C:
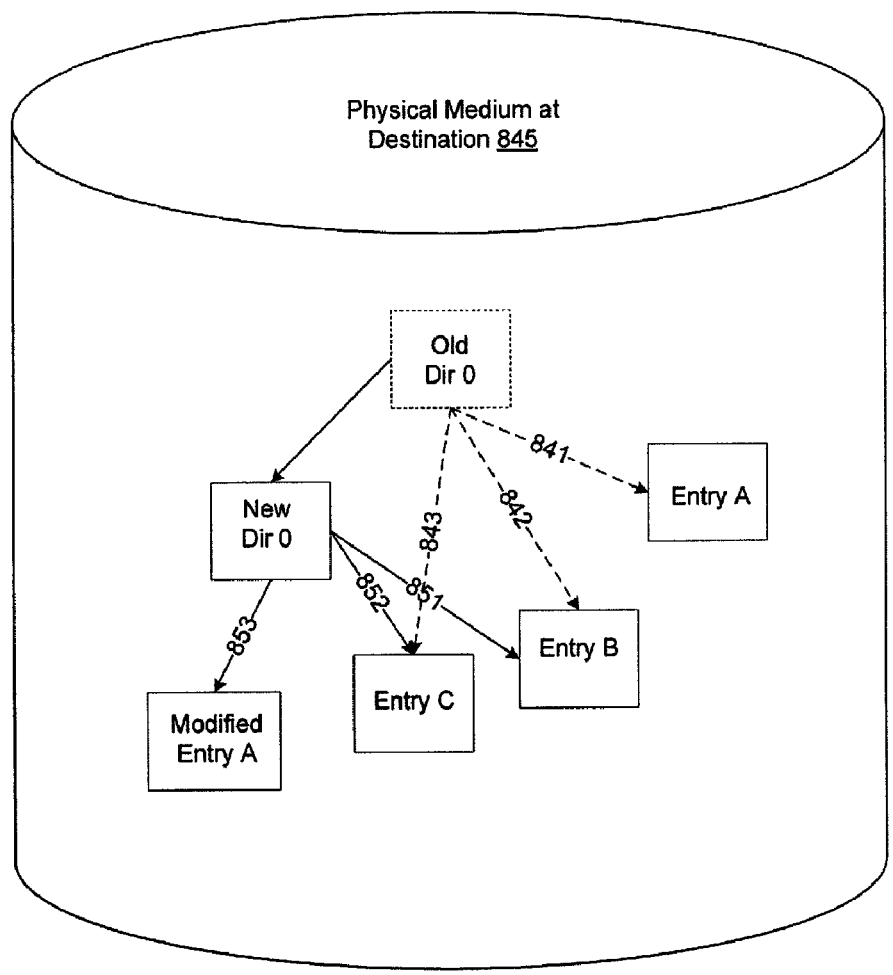
FIG. 8C depicts modifying a directory entry during a replication operation according to an illustrative embodiment.

In the case where a directory entry has been modified since a previous replication of the file system of the source storage system 2A, in a subsequent replication operation, the name of the directory entry that was modified is transferred to the destination storage system 2B in the unordered stream 735. FIG. 8C depicts modifying a directory entry during a replication operation according to an illustrative embodiment. In FIG. 8C, entry A has been modified. After entry A is modified, the buffer tree corresponding to directory 0 is updated in the destination storage medium 845. This is accomplished by storing modified entry A to any unused block of data in physical medium 845 of destination storage system 2B and storing a new directory 0 to a different unused block of data in the physical storage medium 845 with updated pointers including a pointer to modified entry A. Referring to FIG. 8A, before modified entry A was stored in physical medium 845, old directory 0 included pointers 841, 842 and 843 to entries A, B and C, respectively. After modified entry A is stored in physical medium 845, new directory 0 is stored at the different unused block of data in the physical medium 845 with updated pointers 851, 852 and 853 referencing entries B, C and modified entry A, respectively.

The destination storage system 2B is prepared to handle operations in any order. Consider a simple example in which an update replication is to be performed, and the only change to the source since the previous update was that a new file, F, was created in an existing directory D, with some initial data. Three operations would be transferred to the destination including: 1) a directory operation describing the addition of a new entry in D; 2) an inode operation describing the initialization of F's inode; and 3) a data operation describing the initial data in F. These operations may be sent from the source to the destination in any order. The following paragraphs describe the processing done by the destination for different cases of ordering of operations using the example cited above of file F and directory D.

Case (1): when the "directory operation" is processed first, F's inode is initialized creating the entry in D pointing to F. The resulting inode has correct parent and generation number, but its "type" is designated "not yet known." Case (2): when the "data operation" is processed first specifying a block of F's data, again F's inode is initialized. The resulting inode has the correct generation number, but parent information is designated "not yet known." Case (3): when the "inode operation" is processed first, the processing is relatively simpler than in the other two cases, as the subsequent operations need not guess at the inode's meta-data. In cases (1) and (2), by the time the inode operation is processed, a (partially specified) inode is already present at the given inode number. The destination then determines whether the current inode operation represents a replacement or (as in this example) a creation. The determination is made based on the inode's generation number; and, if it doesn't match the generation number in the operation, a replacement is occurring.

Now consider a second slightly different example, in which two (2) changes are made at the source file system since the previous update: in directory D, first file F was deleted; then a new file was created with the same name F, and using the old file's inode number. Again, for the replication, three operations would be transferred to the destination: 1) a "directory operation" describing the modification of the entry in D for a file named F; 2) an "inode operation" describing the initialization of F's new inode; 3) and a "data operation" describing the initial data in F's new file. An important aspect of file replacement (as well as simple deletion) is that the old file's data is freed (recycled). That is, if the old file has no more parents, it can no longer be accessed by clients, and its blocks of data can be re-used for files that have new data. The process of recycling blocks in this fashion is begun whenever the destination learns that a replacement is to be done. In the present example of replacement, whichever of the three operations is processed first will trigger the recycling of data blocks, as all three operations specify the new generation number of the new file F, and the destination can compare the new generation number with the old generation number in the inode, which will be that of the old file. The new file has the same name, "F", as the old file. Thus, a single directory operation is transferred to the destination indicating that the directory entry is modified. If the new file had a different name, say "G", then two directory operations would be transferred: one to delete the entry for F, and the other to create the entry for G. These operations can be received and processed in either order.

Now consider a third example, in which two changes were made at the source file system since the previous update operation: in directory D, a first subdirectory SD was created; then in subdirectory SD, a file F was created, with some data. For the subsequent replication, the following five operations are performed: 1) an inode operation creating SD; 2) an inode operation creating F; 3) a directory operation creating an entry in D pointing to SD; 4) a directory operation creating an entry in SD for F; and 5) a data operation giving a block of data to F. These five operations could happen in any order. If the directory operation creating an entry in SD is processed first, then not only is F's inode initialized, but also must SD's inode, both with incomplete information about meta-data (since neither inode operation has been processed yet).

Now consider an example that follows up the previous example. Suppose that after the replication, file F is deleted, and then subdirectory SD, which is now empty, is also deleted, and then there is another replication. Three operations will be performed including: 1) an inode operation deleting SD; 2) an inode operation deleting F; and 3) a directory operation deleting the entry of D pointing to SD. In one embodiment, no operation is transferred to recycle F's data blocks since the destination does this automatically when processing the inode operation deleting F. Similarly, no operation is transferred to delete the entry of SD pointing to F since the destination does this automatically when processing the inode operation deleting SD. The three operations can be processed in any order. If the inode operation deleting SD is processed first, then after it has been processed, F's inode has invalid information about that file's parent. But this condition is only temporary, as the inode operation deleting F will eventually be processed. The above examples illustrate the range of tasks that the destination can perform to implement the different types of operations, and to ensure that operations can be processed in any order.

In at least certain embodiments, the above described operations are idempotent. Idempotence refers to operations where multiple instances of the operation do not change the result. That is, if an operation is performed twice or more, the same result will be achieved. Idempotence is desirable when a replication is interrupted. For example, the source and the destination may lose contact with each other (e.g., due to network outage or due to outage of either the source or the destination). After the outage, the source and destination will try to resume the replication. To do this, operations are designed so that they can be replayed to achieve the same result. In this context, if the unordered stream of individual data units is somehow interrupted by a system crash or other power failure of the source storage system, the data can be replayed from the last point (e.g., a checkpoint) where the last good data is known to have been replicated. When the data is replayed, there may be some modifications of file system objects that get transferred to the destination storage system twice (or more times). If the destination storage system 2B is designed for idempotent operations, the same result will be achieved even though the same modifications were transferred multiple times. Thus, the replica file system in the destination storage system 2B will remain free from corrupt data.

However, it may not be practically possible to determine exactly how far the destination had progressed before the interruption; instead, an approximate determination is made, such that when the replication is resumed, some operations are re-done. To ensure idempotence of inode operations, idempotent operations are used to recycle file data blocks, and to delete directories. In one embodiment, to ensure idempotence of directory operations, the destination storage system 2B specifically checks for repeated operations. In creating an entry in directory D to point to file F, first the destination checks whether an entry by the same name already exists. In this embodiment, a new entry will not be created if there is an existing one. In deleting an entry in directory D for file F, first the destination checks whether the entry still exists, and does nothing if the entry no longer exists.

Accordingly, in the foregoing a method and apparatus for replicating a file system at the logical block level using an unordered stream of individual data units is described. The foregoing description has been directed to specific embodiments of this invention. It will be apparent to persons of skill in the art, however, that other variations and modifications may be made to the described embodiments, while maintaining some or all of their advantages. For example, it will be apparent from this description that aspects of the present invention may be embodied, at least in part, in software, hardware, firmware, or in combination thereof. The techniques described herein may be carried out in a computer system or other data processing system in response to its processor, such as a microprocessor, executing sequences of instructions contained in a memory, such as a ROM, volatile RAM, non-volatile memory, cache memory, or other remote storage device memory. In various embodiments, hardwired circuitry may be used in combination with software instructions to implement this present description. Thus, the techniques are not limited to any specific combination of hardware circuitry and/or software, or to any particular source for the instructions executed by a data processing system Additionally, the apparatuses described herein may be specially constructed for the required purposes, or they may comprise a general purpose computer selectively activated or configured by a computer program stored in a memory of the computer. Such a computer program may be stored in a computer-readable medium. A computer-readable medium can be used to store software instructions, which when executed by a data processing system, causes the system to perform the various methods of this description. A computer-readable medium may include any mechanism that provides information in a form accessible by a machine (e.g., a computer, network device, personal digital assistant, or any device with a set of one or more processors). For example, a computer-readable medium may include any type of disk including floppy disks, hard drive disks (HDDs), solid-state devices (SSDs), optical disks, CD-ROMs, and magnetic-optical disks, ROMs, RAMs, EPROMs, EEPROMs, other flash memory, magnetic or optical cards, or any type of media suitable for storing instructions in an electronic format.

Throughout the foregoing description, for the purposes of explanation, numerous specific details were set forth in order to provide a thorough understanding of the invention. It will be apparent, however, to one skilled in the art that the invention may be practiced without some of these specific details. In addition, embodiments of the invention may include various operations as set forth above, or fewer operations or more operations, or operations in an order which is different from the order described herein. Accordingly, the scope and spirit of the invention should be judged in terms of the claims which follow as well as the legal equivalents thereof.

What is claimed is:

1. A method of replicating data residing in a data container of a source storage server, the method comprising:
   creating a snapshot of the data container;
   identifying changes in the data container of the source storage server over a period of time by comparing the snapshot with a previous snapshot, the previous snapshot corresponding to an earlier replication operation; and
   asynchronously transferring the changes in the data container of the source storage server to a destination storage server in a stream of individual data units without first determining a relationship between the data units and a directory structure of a file system associated with the data container to replicate the data container of the source storage server in the destination storage server at a logical block level without regard to differences in geometry of physical persistent storage of the source and destination storage servers, and without regard to differences in data container format of the source and destination storage servers.

2. The method of claim 1, wherein the identifying comprises sequentially scanning each inode entry in an inode file associated with the data container of the source storage server to detect changes in a data object of the data container since the previous snapshot corresponding to the earlier replication operation, wherein the inode file includes a data structure representing a master list of data objects and each inode entry identifies a particular data object within the data container.

3. The method of claim 2, wherein the transferring comprises transferring changes detected in the data object during a single pass through the inode entries of the inode file and the transferring occurs at the same time remaining inode entries in the inode file are being sequentially scanned.

4. The method of claim 3, further comprising one or more from the list consisting of:
   transferring a file in the data container of the source storage server to the destination storage server before transferring a directory of the data container of the source storage server in which the file is located;
   transferring data of a file in the data container of the source storage server to the destination storage server before transferring metadata describing the file; and
   transferring individual data blocks of a file out-of-order.

5. A method of replicating data residing in a data container of a source storage server, the method comprising:
   receiving, at a destination storage server from a source storage server, a stream of individual data units transferred without a relationship between the data units and a directory structure of a file system associated with the data container having been determined, the stream of individual data units including changes in the data container of the source storage server since a previous replication operation; and
   replicating the changes in the data container of the source storage server at the destination storage server at a logical block level using the stream of individual data units without regard to differences in geometry of physical persistent storage of the source and destination storage servers and without regard to differences in data container format of the source and destination storage servers.

6. The method of claim 5, wherein the stream of individual data units includes:
   data associated with a data object that has been changed in the data container of the source storage server; and
   an inode number of an inode file of the source storage server assigned to the data object that has been changed, wherein the inode file of the source storage server includes a data structure representing a master list of data objects of the data container in the source storage server and each inode entry identifies a particular data object within the data container.

7. The method of claim 6, further comprising:
   matching the inode number of the data object in the inode file of the source storage server with a corresponding inode number in a replicated inode file at the destination storage server; and
   adding the data object that has been changed to an inode entry in the replicated inode file at the destination storage server so that the inode number of the inode file of the source storage server is preserved in the replicated inode file of the destination storage server.

8. The method of claim 7, further comprising:
   storing the data associated with the data object that has been changed to an unused block of data in physical persistent storage of the destination storage server; and
   updating a buffer tree representing a logical block structure of a data container at the destination storage server to reference the data associated with the data object that has been changed, wherein the buffer tree includes a hierarchical metadata structure containing pointers to logical blocks of data in the data container at the destination storage server.

9. The method of claim 8, wherein updating the buffer tree comprises:
   updating an indirect block in the buffer tree to include a pointer to the data associated with the data object that has been changed;
   storing the indirect block to a different unused block of data in physical persistent storage of the destination storage server; and
   repeating the updating and storing until all pointers to the data associated with the data object that has been changed in the buffer tree have been updated.

10. The method of claim 8, further comprising assigning a file block number to a highest-level indirect block in the buffer tree referencing the data associated with the data object that has been changed.

11. The method of claim 8, further comprising:
    checking directory entries in the inode file at the destination storage server to determine whether a directory entry already exists in the directory;
    updating the inode file to include the directory entry when the directory entry does not already exist; and
    updating the inode file to replace the directory entry when the directory entry already exists.

12. A source storage system comprising:
    a processor;
    a network interface through which the source storage system can communicate with a destination storage server;
    a storage manager configured to perform asynchronous replication operations, the storage manager including:
    a snapshot differential module configured to:
    create a snapshot of a data container stored in a source storage server; and
    identify changes in the data container of the source storage server over a period of time by comparing the snapshot with a previous snapshot, the previous snapshot corresponding to an earlier replication operation; and
    a source replication engine coupled with the snapshot differential module, the source replication engine configured to transfer the changes in the data container of the source storage server to the destination storage server in a stream of individual data units without first determining a relationship between the data units and a directory structure of a file system associated with the data container to replicate the data container of the source storage server in the destination storage server at a logical block level without regard to either differences in geometry of physical persistent storage of the source and destination storage servers or differences in data container format of the source and destination storage servers.

13. The source storage system of claim 12, wherein the snapshot differential module is further configured to sequentially scan each inode entry in an inode file of the data container of the source storage server to detect changes in a data object of the data container, wherein the inode file includes a data structure representing a master list of data objects and each inode entry identifies a particular data object within the data container.

14. The source storage system of claim 13, wherein the source replication engine is further configured to transfer changes detected in the data object during a single pass through the inode entries of the inode file, wherein the transferring occurs at the same time remaining inode entries in the inode file are being sequentially scanned.

15. The source storage system of claim 13, wherein the source replication engine is further configured to transfer one or more from the list consisting of:
    a file in the data container of the source storage server to the destination storage server before transferring a directory of the data container of the source storage server in which the file is located;
    a file in the data container of the source storage server to the destination storage server before transferring metadata describing the file; and
    individual data blocks of a file out-of-order.

16. A destination storage system comprising:
    a processor;
    a network interface through which the destination storage system can communicate with a source storage system;
    a storage manager configured to perform asynchronous replication operations, the storage manager including:
    a destination replication engine configured to receive from a source storage server a stream of individual data units transferred without a relationship between the data units and a directory structure of a file system associated with the source storage server having been determined, the stream of individual data units including changes in a data container of the source storage server since a previous replication operation; and
    a write allocation module coupled with the destination replication engine, the write allocation module configured to replicate the changes in the data container of the source storage server at a destination storage server at a logical block level using the stream of individual data units without regard to differences in geometry of physical persistent storage of the source and destination storage servers, and without regard to differences in data container format of the source and destination storage servers.

17. The destination storage system of claim 16, wherein the stream of individual data units includes:
- data of a data object that has been changed in the data container of the source storage server; and
- an inode number of an inode file of the source storage server assigned to the data object that has been changed, wherein the inode file of the source storage server includes a data structure representing a master list of data objects of the data container in the source storage server and each inode entry identifies a particular data object within the data container.

18. The destination storage system of claim 17, wherein the destination replication module is further configured to:
- match the inode number of the data object in the inode file of the source storage server with a corresponding inode number in a replicated inode file at the destination storage server; and
- add the data object that has been changed to an inode entry in the replicated inode file at the destination storage server so that the inode number of the inode file of the source storage server is preserved in the replicated inode file of the destination storage server.

19. The destination storage system of claim 18, wherein the write allocation module is further configured to:
- store the data of the data object that has been changed to an unused block of data in physical persistent storage of the destination storage server; and
- update a buffer tree representing a logical block structure of a data container at the destination storage server to reference the data of the data object that has been changed, wherein the buffer tree includes a hierarchical metadata structure containing pointers to logical blocks of data in the data container at the destination storage server.

20. The destination storage system of claim 19, wherein the destination replication engine is further configured to assign a file block number to a highest-level indirect block in the buffer tree pointing to the data of the data object that has been changed.

21. The destination storage system of claim 19, wherein the destination replication engine is further configured to:
- check directory entries in the inode file at the destination storage server to determine whether a directory entry already exists in the directory;
- update the inode file to include the directory entry to be added when the directory entry does not already exist; and
- update the inode file to replace the directory entry when the directory entry already exists.

* * * * *